United States Patent
Lipo et al.

(10) Patent No.: US 10,784,727 B2
(45) Date of Patent: Sep. 22, 2020

(54) SALIENT POLE, WOUND FIELD, SYNCHRONOUS MACHINE WITH ENHANCED SALIENCY

(71) Applicant: Wisconsin Alumni Research Foundation, Madison, WI (US)

(72) Inventors: Thomas A. Lipo, Middleton, WI (US); Wenbo Liu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 698 days.

(21) Appl. No.: 15/371,949

(22) Filed: Dec. 7, 2016

(65) Prior Publication Data
US 2018/0159391 A1   Jun. 7, 2018

(51) Int. Cl.
| | | |
|---|---|---|
| *H02K 1/24* | (2006.01) | |
| *H02K 1/14* | (2006.01) | |
| *H02K 3/32* | (2006.01) | |
| *H02K 19/10* | (2006.01) | |

(52) U.S. Cl.
CPC .............. *H02K 1/24* (2013.01); *H02K 1/146* (2013.01); *H02K 3/325* (2013.01); *H02K 19/10* (2013.01); *H02K 2213/03* (2013.01)

(58) Field of Classification Search
CPC ............ H02K 1/22; H02K 1/223; H02K 1/26; H02K 1/24; H02K 1/146; H02K 19/10; H02K 21/04; H02K 21/042; H02K 21/10
USPC .................................. 310/162, 179, 216.106
See application file for complete search history.

(56) References Cited

U.S. PATENT DOCUMENTS

| | | | |
|---|---|---|---|
| 4,074,160 A | 2/1978 | Broadway | |
| 5,214,839 A * | 6/1993 | Rieber ................... | H02K 3/493 29/596 |
| 2010/0308686 A1* | 12/2010 | Mathoy .................. | H02K 1/246 310/216.106 |
| 2011/0030419 A1* | 2/2011 | Kikuchi .................. | F04B 35/04 62/498 |

(Continued)

OTHER PUBLICATIONS

Shanawany et al., A Dual Stator Winding-Mixed Pole Brushless Synchronous Generator (Design, Performance Analysis & Modeling), Selected Topics in Power Systems and Remote Sensing, 10th WSEAS/IASME International Conference on Electric Power Systems, High Voltages, Electric Machines, 6th WSEAS International Conference on Remote Sensing, Iwate Prefectural University, Japan, Oct. 4, 2010, pp. 159-165.

(Continued)

*Primary Examiner* — Bryan R Perez
(74) *Attorney, Agent, or Firm* — Bell & Manning, LLC

(57) ABSTRACT

A rotor for a salient pole, wound field, synchronous machine includes a rotor core, a plurality of pole bodies, and a field winding. Each pole body of the plurality of pole bodies includes a pole core, a pole shoe, and a single flux barrier. The single flux barrier forms an enclosed space filled with a material having a magnetic permeability between zero and 1000 relative to a magnetic permeability of a vacuum. The single flux barrier includes a top wall, a shaft mounting wall configured to mount adjacent a shaft when the rotor is mounted to the shaft, and a plurality of interior walls connected between the top wall and the shaft mounting wall. The plurality of interior walls extend parallel to and centered between a first pole core face and a second pole core face of the pole core that extend from the rotor core.

20 Claims, 26 Drawing Sheets

(56) References Cited

U.S. PATENT DOCUMENTS

2015/0171674 A1  6/2015 Lee et al.
2016/0105088 A1* 4/2016 Narita ................... H02K 19/10
                                              310/216.091

OTHER PUBLICATIONS

Sanchez et al., Electromagnetic Analysis of a Wound-Field Generator with Flux-Barrier Rotor for AC Generator Sets, 2015 IEEE International Electric Machines & Drives Conference, May 10, 2015, pp. 273-279.
Staton et al., Maximising the saliency ratio of the synchronous reluctance motor, IEE Proceedings-B, vol. 140, No. 4, Jul. 1993, pp. 249-259.
Vagati et al., Impact of Cross Saturation in Synchronous Reluctance Motors of the Transverse-Laminated Type, IEEE Transactions on Industry Applications, vol. 36, No. 4, Jul./Aug. 2000, pp. 1039-1046.

* cited by examiner though WFSMs and PM machines share the same operating principles, WFSMs operate with a small saliency and a minimal reluctance torque. Saliency relates to a variation of an inductance at a machine terminal as a function of a relative position on a rotor.

SALIENT POLE, WOUND FIELD, SYNCHRONOUS MACHINE WITH ENHANCED SALIENCY

BACKGROUND

Permanent magnet (PM) machines are used in today's hybrid and electric vehicles due to their ideal performance characteristics. With the uncertainty associated with the cost and overseas sourcing of PM materials, other types of machines are being explored to determine if they can offer similar performance without the need for permanent magnets. Salient pole, wound field, synchronous machines (WFSMs) have similar torque characteristics relative to PM machines, but are free of permanent magnet material because a rotor winding generates the field flux instead of the permanent magnet material. Although WFSMs and PM machines share the same operating principles, WFSMs operate with a small saliency and a minimal reluctance torque. Saliency relates to a variation of an inductance at a machine terminal as a function of a relative position on a rotor.

SUMMARY

In an example embodiment, a rotor of a salient pole, wound field, synchronous machine is provided that includes, but is not limited to, a rotor core, a plurality of pole bodies, and a field winding. The rotor core includes, but is not limited to, a rotor shaft face configured to mount to a shaft for rotation of the rotor about a first axis. Each pole body of the plurality of pole bodies includes, but is not limited to, a pole core, a pole shoe, and a single flux barrier. The pole core includes, but is not limited to, a first pole core face and a second pole core face extending from the rotor core. The pole shoe is mounted to the pole core and includes, but is not limited to, an arc face, a first tip extending from a first edge of the arc face, a second tip extending from a second edge of the arc face opposite the first edge, a first pole shoe face extending between the first tip and the first pole core face, and a second pole shoe face extending between the second tip and the second pole core face. The single flux barrier forms an enclosed space filled with a material having a magnetic permeability between approximately zero and approximately 1000 relative to a magnetic permeability of a vacuum. The single flux barrier includes, but is not limited to, a top wall, a shaft mounting wall configured to mount adjacent the shaft when the rotor is mounted to the shaft, and a plurality of interior walls connected between the top wall and the shaft mounting wall. The plurality of interior walls extend parallel to and centered between the first pole core face and the second pole core face. The field winding is wound around each pole core of the plurality of pole bodies.

In another example embodiment, a salient pole, wound field, synchronous machine is provided that includes, but is not limited to, a stator and a rotor. The rotor includes, but is not limited to, a rotor core, a plurality of pole bodies, and a field winding. The rotor core includes, but is not limited to, a rotor shaft face configured to mount to a shaft for rotation of the rotor relative to the stator about a first axis. Each pole body of the plurality of pole bodies includes, but is not limited to, a pole core, a pole shoe, and a single flux barrier. The pole core includes, but is not limited to, a first pole core face and a second pole core face extending from the rotor core. The pole shoe is mounted to the pole core and includes, but is not limited to, an arc face, a first tip extending from a first edge of the arc face, a second tip extending from a second edge of the arc face opposite the first edge, a first pole shoe face extending between the first tip and the first pole core face, and a second pole shoe face extending between the second tip and the second pole core face. The single flux barrier forms an enclosed space filled with a material having a magnetic permeability between approximately zero and approximately 1000 relative to a magnetic permeability of a vacuum. The single flux barrier includes, but is not limited to, a top wall, a shaft mounting wall configured to mount adjacent the shaft when the rotor is mounted to the shaft, and a plurality of interior walls connected between the top wall and the shaft mounting wall. The plurality of interior walls extend parallel to and centered between the first pole core face and the second pole core face. The field winding is wound around each pole core of the plurality of pole bodies Other principal features of the disclosed subject matter will become apparent to those skilled in the art upon review of the drawings described below, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Salient permanent magnet (PM) machines have a built-in saliency structure due to the presence of magnets on a rotor d-axis, wherein the magnet effectively acts as a large air gap to the stator flux. Studies have suggested that a peak output torque is improved with the addition of motor saliency over that obtainable from a non-salient pole structure. For example, in a salient pole PM traction motor, it was shown that about 40% of peak output torque is made up of reluctance torque arising from the saliency.

A salient pole synchronous machine has a non-uniform air gap as understood by a person of skill in the art. For example, referring to FIG. 1, a front view of a salient pole, wound field, synchronous machine (WFSM) 100 is shown in an illustrative embodiment. In general, salient pole WFSM 100 may be used as a motor or a generator dependent on the driving mechanism. Salient pole WFSM 100 illustrates a conventional design. Salient pole WFSM 100 may include a stator 102 and a rotor 104. If salient pole WFSM 100 is utilized as a motor, stator 102 causes rotor 104 to rotate utilizing electrical energy thereby rotating a shaft mounted to rotor 104 to provide mechanical energy; whereas, if salient pole WFSM 100 is utilized as a generator, the shaft is rotated by an external mechanical force/torque that causes rotor 104 to rotate thereby causing stator 102 to generate electrical energy. In the illustrative embodiment of FIG. 1, rotor 104 is mounted in a center of stator 102 that is generally cylindrical though other arrangements may be used.

Figure 1:
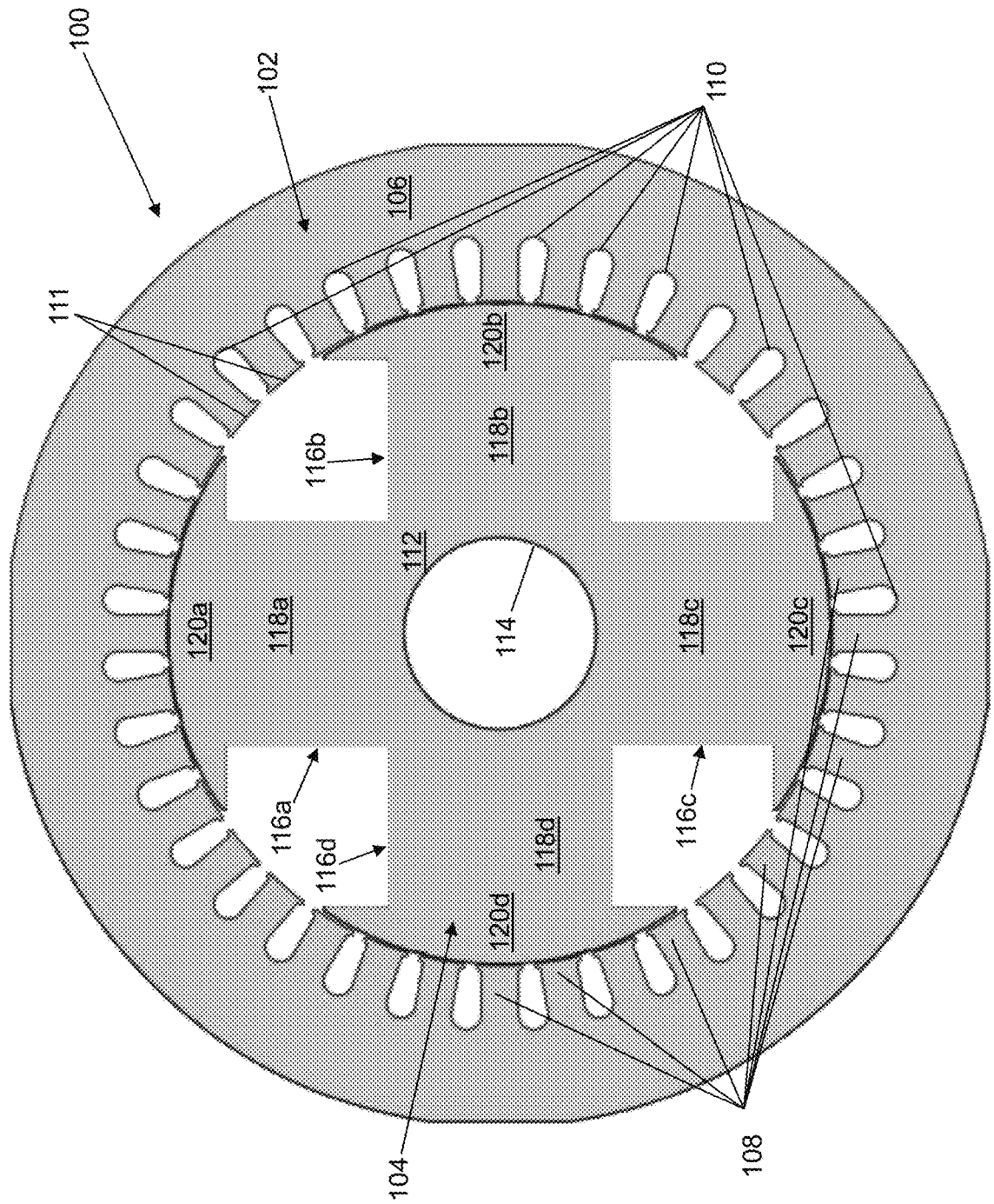
FIG. 1 depicts a front view of a four pole, salient pole, wound field, synchronous machine (WFSM) in accordance with an illustrative embodiment.

In the illustrative embodiment of FIG. 1, stator 102 includes a stator core 106 and a plurality of teeth 108. Each tooth of the plurality of teeth 108 includes a slot wall of a plurality of slot walls 110 and a tooth face of a plurality of tooth faces 111. The plurality of teeth 108 are mounted to project from stator core 106 towards rotor 104. In the illustrative embodiment of FIG. 1, stator 102 includes 36 teeth. In alternative embodiments, salient pole WFSM 100 may have a fewer or a greater number of teeth. Each tooth face of the plurality of tooth faces 111 faces rotor 104. One or more armature windings, also referred to as stator windings, are wound through slots formed by the plurality of slot walls 110 in various manners, as understood by a person of skill in the art, to carry one or more phases of electrical current. A number of stator poles is the same as a number of rotor poles. The plurality of teeth 108 determine whether the winding configuration is concentrated or distributed. For illustration, the one or more armature windings may be wound full pitched, concentrated or distributed or short pitched, distributed as understood by a person of skill in the art.

In the illustrative embodiment of FIG. 1, rotor 104 includes a rotor core 112 and a plurality of pole bodies 116. An interior of rotor core 112 is defined by a rotor shaft face 114 that is configured to mount to the shaft for rotation of rotor 104 with the shaft. In the illustrative embodiment of FIG. 1, rotor 104 includes four pole bodies though any even number of pole bodies may be used. The plurality of pole bodies 116 includes a first pole body 116a, a second pole body 116b, a third pole body 116c, and a fourth pole body 116d. The plurality of pole bodies 116 are mounted to project from rotor core 112 toward the plurality of tooth faces 111 of stator 102. The plurality of pole bodies 116 act as salient magnetic poles. Rotor 104 may have a greater or a fewer number of pole bodies and include pole bodies having different shapes. The plurality of pole bodies 116 extend from rotor core 112 opposite rotor shaft face 114 at equal angular intervals and have a common arc length dimension. Each pole body of the plurality of pole bodies 116 may include a pole core 118 and a pole shoe 120 that generally form a "T" shape. Pole core 118 mounts between rotor core 112 and pole shoe 120.

First pole body 116a of the plurality of pole bodies 116 includes a first pole core 118a and a first pole shoe 120a. Second pole body 116b of the plurality of pole bodies 116 includes a second pole core 118b and a second pole shoe 120b. Third pole body 116c of the plurality of pole bodies 116 includes a third pole core 118c and a third pole shoe 120c. Fourth pole body 116d of the plurality of pole bodies 116 includes a fourth pole core 118d and a fourth pole shoe 120d.

Figure 2:
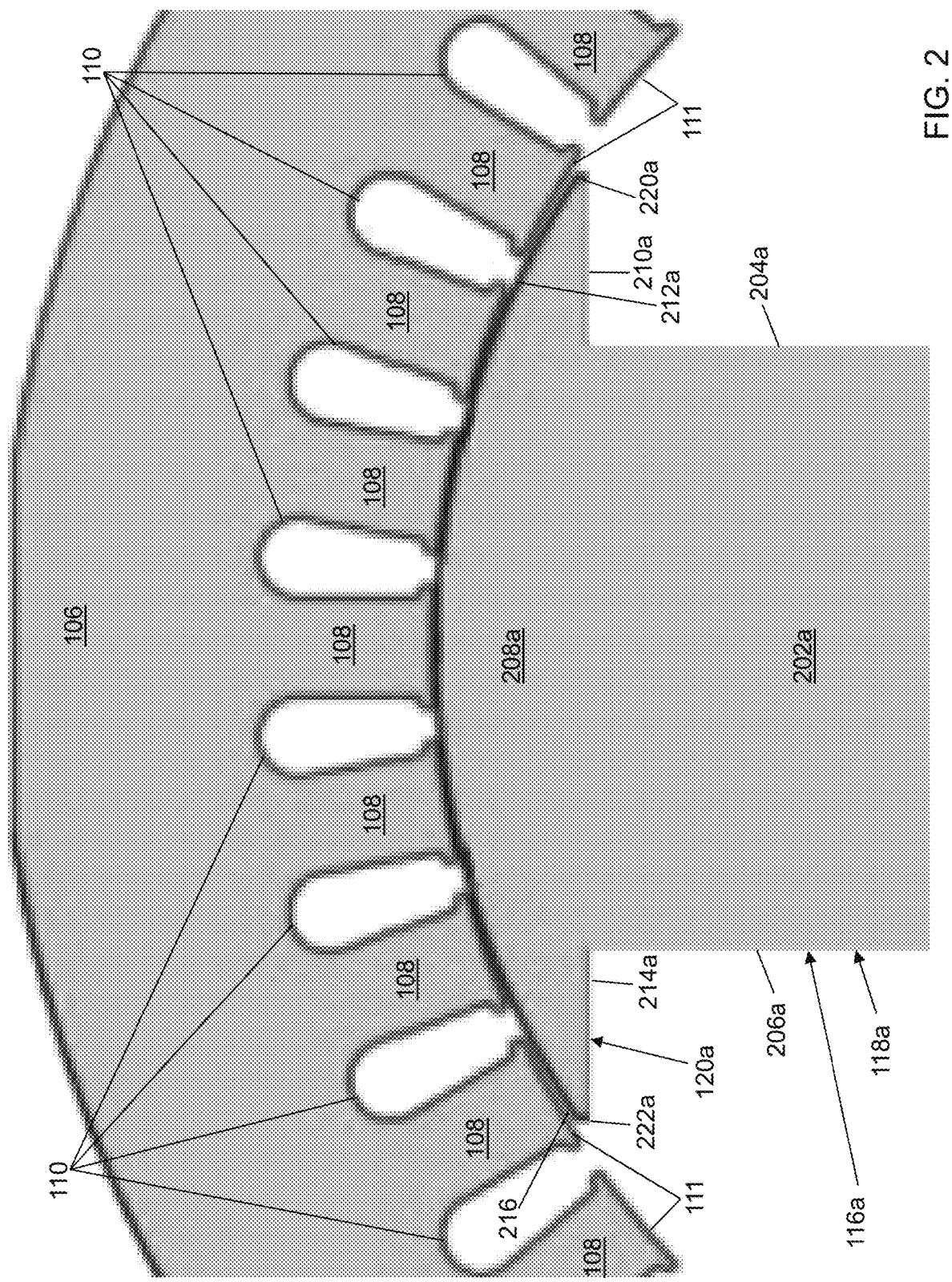
FIG. 2 depicts a zoomed portion of one pole of the front view of the salient pole WFSM of FIG. 1 in accordance with an illustrative embodiment.
Figure 9:
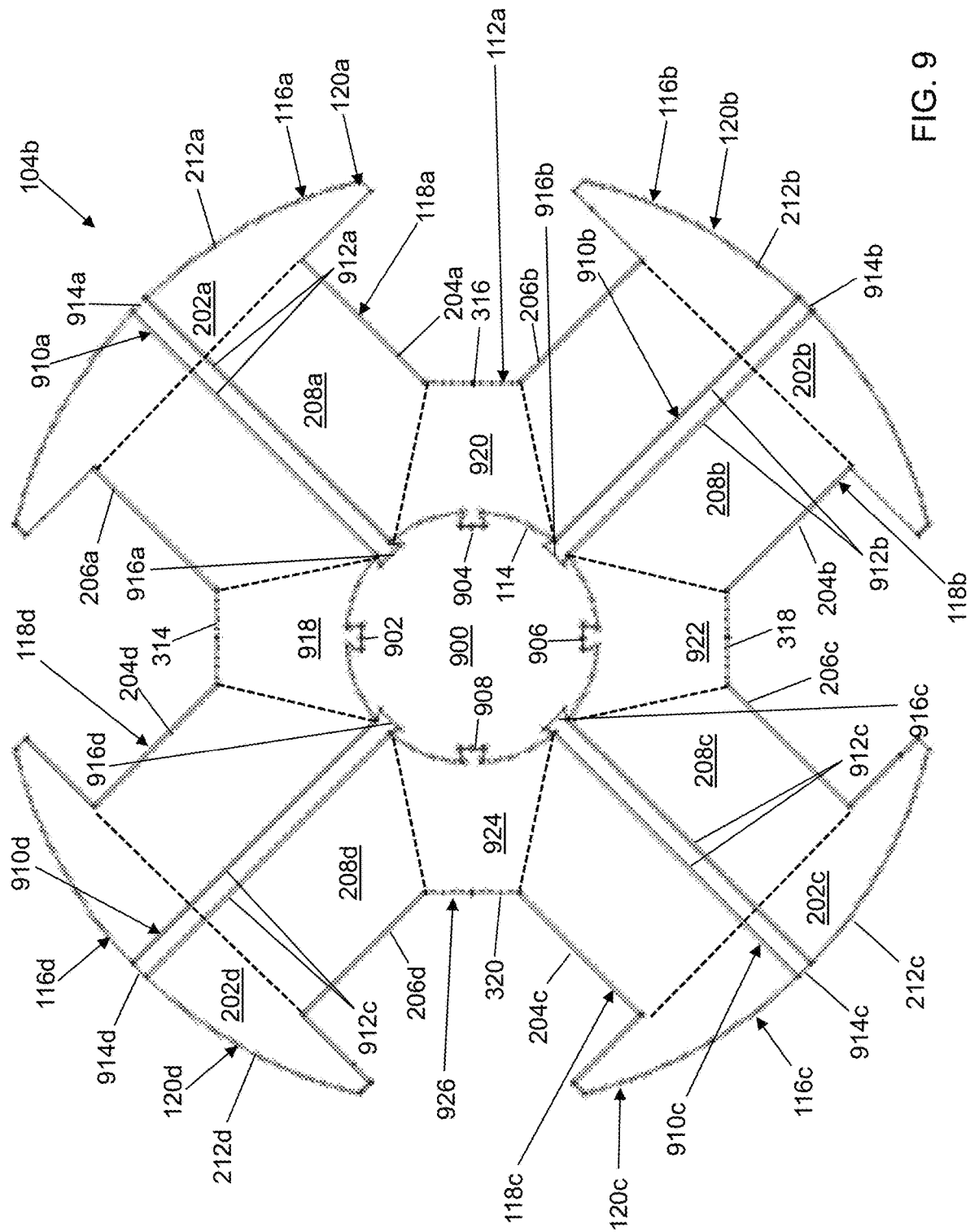
FIG. 9 depicts a front view of a rotor of a four pole, salient pole WFSM with a flux barrier in accordance with a first illustrative embodiment.

Referring to FIGS. 2 and 9, a zoomed portion of a front view of salient pole WFSM 100 is shown in accordance with an illustrative embodiment. First pole core 118a may include a first pole core front face 202a, a first pole core right face 204a, a first pole core back face 300a (shown referring to FIG. 3), and a first pole core left face 206a. Each of first pole core front face 202a, first pole core right face 204a, first pole core back face 300a, and first pole core left face 206a may be generally flat and rectangular. First pole core 118a may be formed of a conductive material such as iron or steel. First pole core 118a may be formed of a solid section of conductive material or of a plurality of laminations stacked together. The plurality of laminations may be stacked parallel to each other from first pole core front face 202a to first pole core back face 300a such that first pole core right face 204a and first pole core left face 206a are not solid, but are formed of a stack of laminations. In an alternative embodiment, the plurality of laminations may be stacked parallel to each other from first pole core right face 204a to first pole core left face 206a such that first pole core front face 202a and first pole core back face 300a are not solid, but are formed of a stack of laminations.

Second pole core 118b, third pole core 118c, and fourth pole core 118d may be formed in a similar manner. Second pole core 118b may include a second pole core front face 202b, a second pole core right face 204b, a second pole core back face 300b (shown referring to FIG. 3), and a second pole core left face 206b. Third pole core 118c may include a third pole core front face 202c, a third pole core right face 204c, a third pole core back face 300c (shown referring to FIG. 3), and a third pole core left face 206c. Fourth pole core 118d may include a fourth pole core front face 202d, a fourth pole core right face 204d, a fourth pole core back face 300d (shown referring to FIG. 3), and a fourth pole core left face 206d.

First pole shoe 120a may include a first pole shoe front face 208a, a first pole shoe right face 210a, a first pole shoe arc face 212a, a first pole shoe back face 302a (shown referring to FIG. 3), and a first pole shoe left face 214a. First pole shoe front face 208a and first pole shoe back face 302a may be generally flat. First pole shoe arc face 212a may be arced and face the plurality of tooth faces 111 of stator 102. First pole shoe right face 210a and pole shoe left face 214a may be generally flat or curved. First pole shoe right face 210a mounts between first pole core right face 204a and first pole shoe arc face 212a. First pole shoe left face 214a mounts between first pole core left face 206a and first pole shoe arc face 212a.

First pole shoe right face 210a and first pole shoe arc face 212a are joined at a first tip 220a. First pole shoe left face 214a and first pole shoe arc face 212a are joined at a second tip 222a. First tip 220a and second tip 222a may have different shapes. For example, in the illustrative embodiment of FIG. 2, first tip 220a and second tip 222a form a first point shape that is generally pointed. In the illustrative embodiment of FIG. 3, first tip 220b and second tip 222b form a second point shape that is truncated. In the illustrative embodiment of FIG. 4, first tip 220c and second tip 222c form a third point shape that is further truncated.

First pole shoe 120a may be formed of a magnetic material such as iron or steel. First pole shoe 120a may be formed of a plurality of laminations stacked together. The plurality of laminations may be stacked parallel to each other from first pole shoe front face 208a to first pole shoe back face 302a such that first pole shoe right face 210a and first pole shoe left face 214a are not solid, but are formed of a stack of laminations. In an alternative embodiment, the plurality of laminations may be stacked parallel to each other from first pole shoe right face 210a to first pole shoe left face 214a such that first pole shoe front face 208a and first pole shoe back face 302a are not solid, but are formed of a stack of laminations.

Second pole shoe 120b, third pole shoe 120c, and fourth pole shoe 120d may be formed in a similar manner. Second pole shoe 120b may include a second pole shoe front face 208b, a second pole shoe right face 210b, a second pole shoe arc face 212b, a second pole shoe back face 302b (shown referring to FIG. 3), and a second pole shoe left face 214b. Third pole shoe 120c may include a third pole shoe front face 208c, a third pole shoe right face 210c, a third pole shoe arc face 212c, a third pole shoe back face 302c (shown referring to FIG. 3), and a third pole shoe left face 214c. Fourth pole shoe 120d may include a fourth pole shoe front face 208d, a fourth pole shoe right face 210d, a fourth pole shoe arc face 212d, a fourth pole shoe back face 302d (shown referring to FIG. 3), and a fourth pole shoe left face 214d.

As stated previously, stator 102 and rotor 104 are separated by a non-uniform air gap. For example, a first air gap 216 is formed between the plurality of tooth faces 111 of stator 102 and each pole shoe arc face 212 of the plurality of pole bodies 116 of rotor 104. Different air gaps result between tooth faces 111 that are not opposite pole shoe arc face 212 of the plurality of pole bodies 116. As rotor 104 rotates, a position of first air gap 216 and the different air gaps rotates relative to the plurality of teeth 108 of stator 102.

Figure 3:
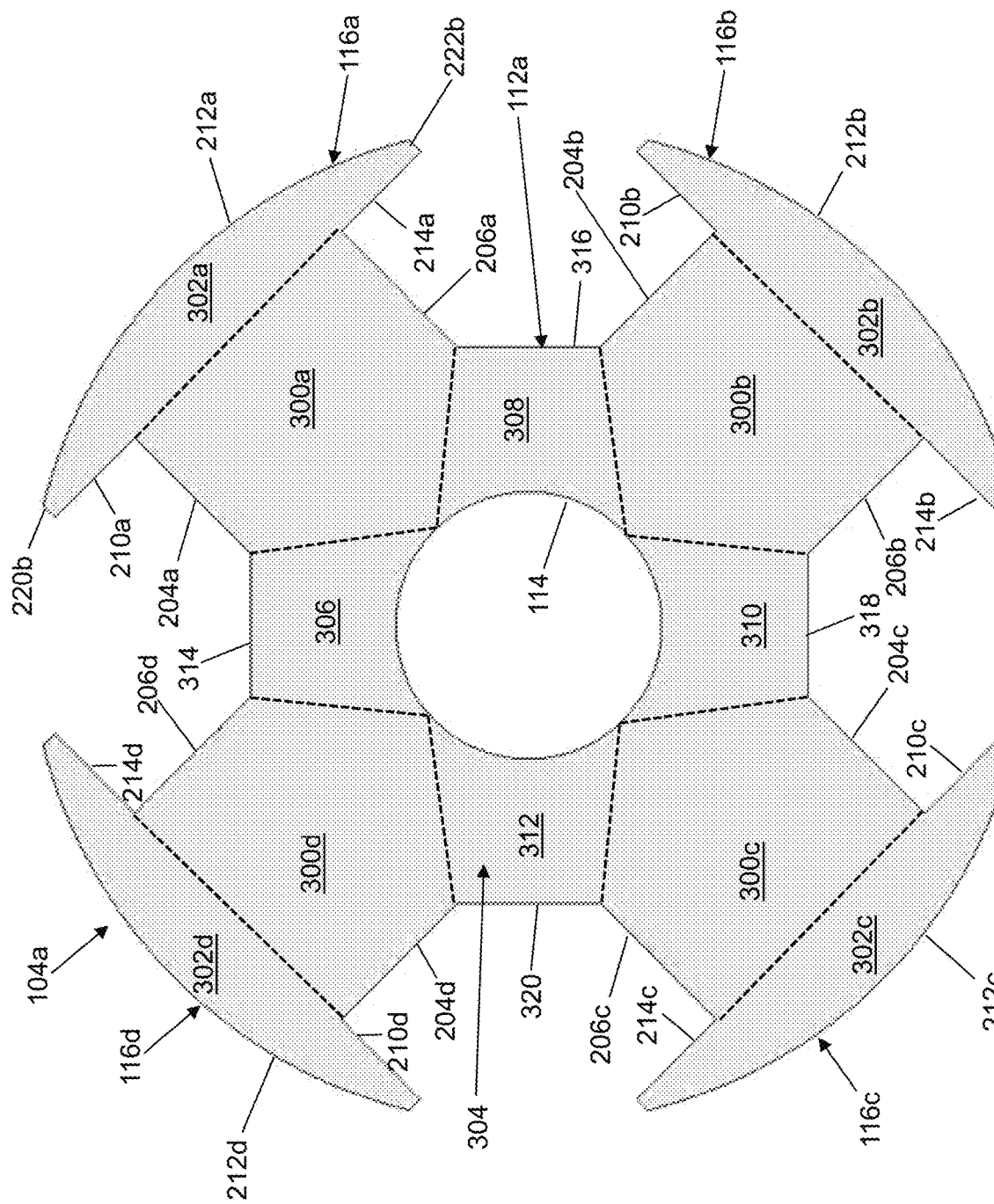
FIG. 3 depicts a back view of a rotor of the salient pole WFSM in accordance with an illustrative embodiment.

Referring to FIG. 3, a back view of a second rotor 104a is shown in accordance with an illustrative embodiment. Second rotor 104a is similar to rotor 104 except that second rotor 104a includes a second rotor core 112a instead of rotor core 112. Second rotor core 112a includes a connecting face between each pole body of the plurality of pole bodies 116. A rotor back face 304 of second rotor 104a may include first pole core back face 300a, first pole shoe back face 302a, second pole core back face 300b, second pole shoe back face 302b, third pole core back face 300c, third pole shoe back face 302c, fourth pole core back face 300d, fourth pole shoe back face 302d, a first core back face portion 306, a second core back face portion 308, a third core back face portion 310, and a fourth core back face portion 312. The dashed lines included in FIG. 3 are intended to illustrate face boundaries for descriptive purposes though it should be understood that rotor back face 304 may be formed of a continuous surface of a common material. The continuous surface may be a lamination of steel or iron, for example. Additionally different face boundaries may be defined as a transition between the plurality of pole bodies 116 and rotor core 112, 112a.

Though not shown, a rotor front face of second rotor 104a may be identical to rotor back face 304. FIG. 9 shows a rotor back face 926 identical to rotor back face 304 except with a flux barrier formed in each pole body of the plurality of pole bodies. First core back face portion 306 may extend between rotor shaft face 114 and a first rotor core face 314. Second core back face portion 308 may extend between rotor shaft face 114 and a second rotor core face 316. Third core back face portion 310 may extend between rotor shaft face 114 and a third rotor core face 318. Fourth core back face portion 312 may extend between rotor shaft face 114 and a fourth rotor core face 320.

First rotor core face 314 may be generally flat and rectangular and extend between first core back face portion 306 and a first core front face portion 918 (shown in FIG. 9 except with a flux barrier as described further below). Second rotor core face 316 may be generally flat and rectangular and extend between second core back face portion 308 and a second core front face portion 920 (shown in FIG. 9 except with a flux barrier as described further below). Third rotor core face 318 may be generally flat and rectangular and extend between third core back face portion 310 and a third core front face portion 922 (shown in FIG. 9 except with a flux barrier as described further below). Fourth rotor core face 320 may be generally flat and rectangular and extend between fourth core back face portion 312 and a fourth core front face portion 924 (shown in FIG. 9 except with a flux barrier as described further below). In alternative embodiments, first rotor core face 314, second rotor core face 316, third rotor core face 318, and fourth rotor core face 320 may not be flat or rectangular. For example, first rotor core face 314, second rotor core face 316, third rotor core face 318, and fourth rotor core face 320 may be arced.

First rotor core face 314 also extends between first pole core right face 204a of first pole body 116a and a fourth pole core left face 206d of fourth pole body 116d. Second rotor core face 316 also extends between a second pole core right face 204b of second pole body 116b and first pole core left face 206a of first pole body 116a. Third rotor core face 318 also extends between a third pole core right face 204c of third pole body 116c and a second pole core left face 206b of second pole body 116b. Fourth rotor core face 320 also extends between a fourth pole core right face 204d of fourth pole body 116d and a third pole core left face 206c of third pole body 116c.

First core back face portion 306, second core back face portion 308, third core back face portion 310, and fourth core back face portion 312 may be formed of a magnetically conductive material such as iron or steel. First core back face portion 306, second core back face portion 308, third core back face portion 310, and fourth core back face portion 312 may be formed of a solid block of material or of a plurality of laminations stacked together. The plurality of laminations may be stacked parallel to each other from core back face portions 306, 308, 310, 312 to core front face portions 918, 920, 922, 924 such that rotor shaft face 114 and rotor core faces 314, 316, 318, 320 are not solid, but are formed of a stack of laminations. The plurality of laminations may be stacked parallel to each other from rotor shaft face 114 to rotor core faces 314, 316, 318, 320 such that core back face portions 306, 308, 310, 312 and the core front face portions 918, 920, 922, 924 are not solid, but are formed of a stack of laminations.

Figure 4:
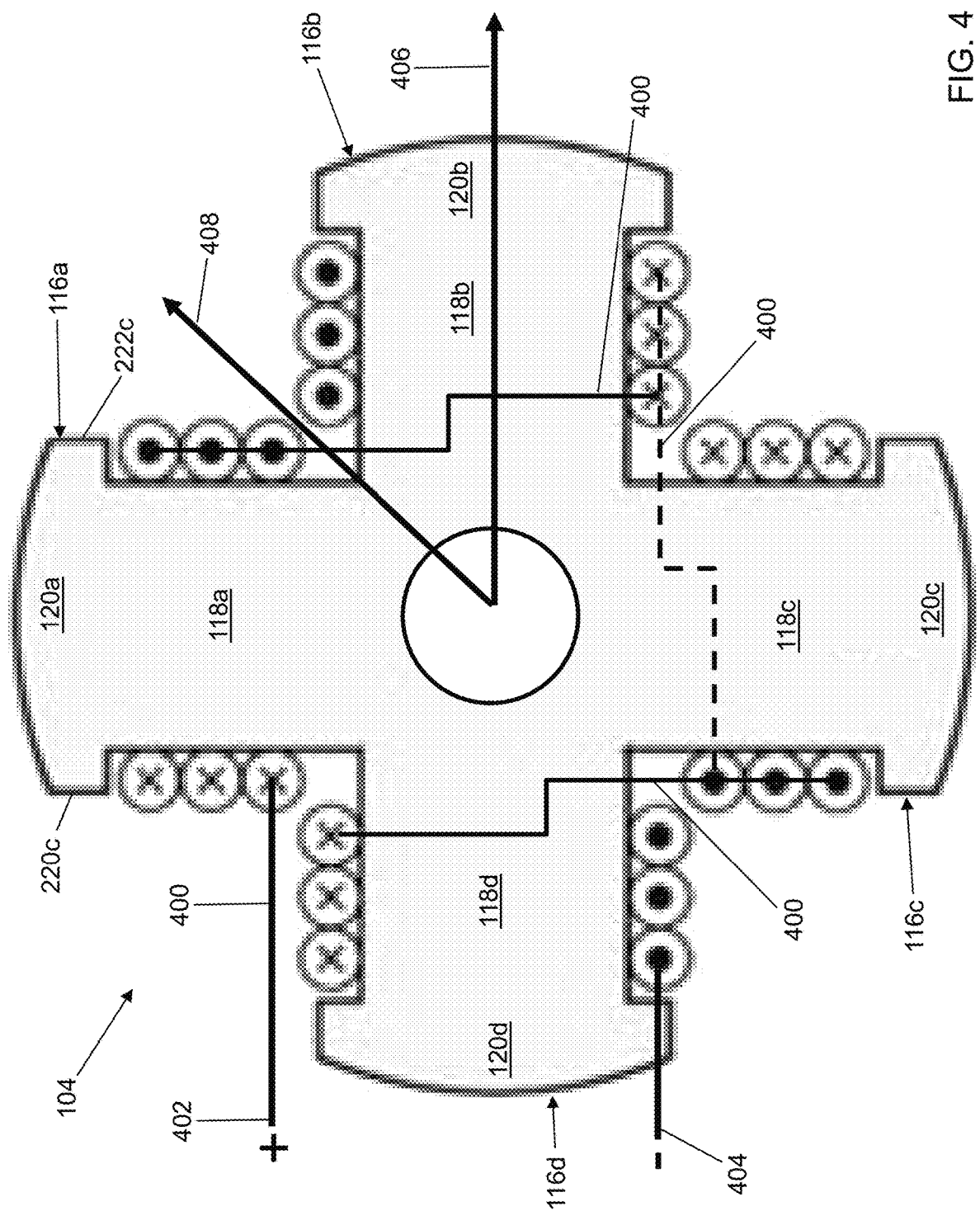
FIG. 4 depicts a front view of the rotor of the salient pole WFSM with windings in accordance with an illustrative embodiment.

Referring to FIG. 4, a field winding 400 is wound around the plurality of pole cores 118 including first pole core 118a, second pole core 118b, third pole core 118c, and fourth pole core 118d in the illustrative embodiment of FIG. 4. The plurality of pole shoes 120 including first pole shoe 120a, second pole shoe 120b, third pole shoe 120c, and fourth pole shoe 120d in the illustrative embodiment of FIG. 4, assist in holding field winding 400 in place. A first end of field winding 400 connects to a first terminal 402. A second end of field winding 400 connects to a second terminal 404. First terminal 402 and second terminal 404 supply DC to field winding 400. A symbol "X" denotes wrapping into the page, and a symbol "●" denotes wrapping out of the page. Solid and dashed connecting lines denote wrapping of field winding 400 between the plurality of pole cores 118, where the dashed connecting line is behind third pole core 118c.

In a synchronous motor, application of three-phase alternating current (AC) power to the armature windings wound around the plurality of teeth 108 of stator 102 causes a rotating magnetic field to be setup around rotor 104. The rotating magnetic field attracts a rotor field activated by the DC carried by field winding 400 resulting in a turning force on the shaft or vice versa. The synchronous motor may be provided with or may provide a fewer or a greater number of phases of AC power.

Due to the non-uniform air gap, a reactance varies with a rotor position of rotor 104. As a result, the salient-pole WFSM has two axes of symmetry: (1) a field pole axis 406 (axis of field winding 400 in a direction of the DC field) also called a direct axis or d-axis, and (2) a second axis 408 passing through a center of an interpolar space also called a quadrature axis or q-axis. In the illustrative embodiment of FIG. 4, the q-axis is 90 degrees later than the d-axis because there are four salient poles. As rotor 104 rotates, there is a change in the energy stored. Either energy is extracted from the magnetic field and becomes mechanical energy (motor operation), or energy is stored in the magnetic field and flows into an electrical circuit powered from the stator windings of stator 102 (generator operation).

A steady state performance of a salient pole, WFSM can be modeled using circuit equations with field flux linkage and armature reaction inductances that are nonlinearly dependent on a flux level. However, insight into saliency effects on steady state behavior can be obtained using a simplified model that ignores resistive voltage drop and magnetic saturation resulting in constant equivalent circuit inductances. Assuming distributed stator windings with sinusoidal excitation, and neglecting space harmonics from the rotor field and armature reaction, the resulting steady-state equivalent circuit model can be derived in a dq-reference frame formed by d-axis 406 and q-axis 408.

Figure 5:
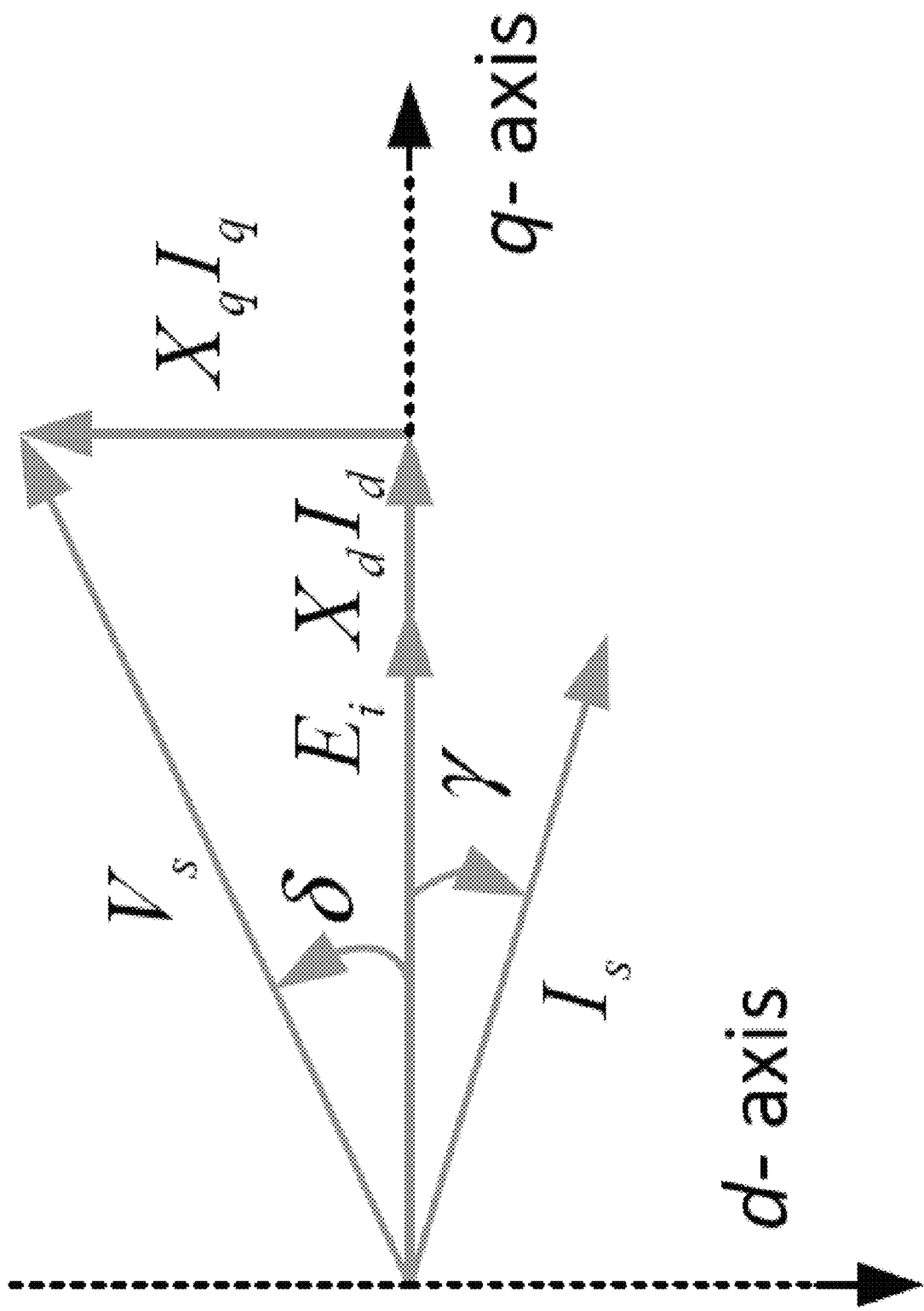
FIG. 5 depicts a phasor diagram of the salient pole WFSM at one per unit speed in accordance with an illustrative embodiment.

Referring to FIG. 5, a phasor diagram of a salient pole, WFSM at one per unit (pu) speed is shown in accordance with an illustrative embodiment. In the per unit system, dq-axis voltage equations can be expressed as:

$$V_q = n_{pu}(E_i + X_d I_d) = n_{pu}(X_{ad} I_f + X_d I_d) \qquad (1)$$

$$V_d = -n_{pu} X_q I_q \qquad (2)$$

where:
- $n_{pu}$ = per unit speed;
- $E_i$ = per unit open circuit voltage (produced by the DC field interacting with the stator winding) at one per unit speed;
- $I_d$ = per unit d-axis current at one per unit speed;
- $I_f$ = per unit wound field current in field winding 400 at one per unit speed;
- $I_q$ = per unit q-axis current at one per unit speed;
- $X_d$ = per unit d-axis synchronous reactance at one per unit speed;
- $X_{ad}$ = per unit d-axis magnetizing reactance at one per unit speed; and
- $X_q$ = per unit q-axis reactance at one per unit speed.

For a given armature current, open circuit voltage $E_i$ can be modeled as proportional to a product of magnetizing reactance $X_{ad}$ and wound field current $I_f$ as indicated in equation (1). With $V_s$ defined as a stator voltage and stator current $I_s$ as a phase or armature current, the dq-components can be expressed in terms of terminal quantities as:

$$V_s \angle \delta = V_q \vec{q} + V_d \vec{d} \quad (3)$$

$$I_s \angle \gamma = I_q \vec{q} + I_d \vec{d} \quad (4)$$

where δ+γ is a power factor (PF) angle, δ is a first portion of a PF angle (also called a torque or load angle) between the q-axis and the stator voltage, and γ is a second portion of the PF angle (also called a gamma or internal PF angle) between the q-axis and the phase current.

An output power P can be approximated by a terminal input power in a high efficiency motor as:

$$P = V_q I_q + V_d I_d \quad (5)$$

or $$P = n_{pu}(E_i I_s \cos\gamma - 0.5(X_d - X_q)I_s^2 \sin 2\gamma) = \quad (6)$$
$$n_{pu}(X_{ad}I_f I_s \cos\gamma - 0.5(X_d - X_q)I_s^2 \sin 2\gamma)$$

By dividing per unit speed $n_{pu}$ from both sides of equation (6), an output torque T at any speed can be calculated as:

$$T = \frac{P}{n_{pu}} = E_i I_s \cos\gamma - 0.5(X_d - X_q)I_s^2 \sin 2\gamma = \quad (7)$$
$$X_{ad}I_f I_s \cos\gamma - 0.5(X_d - X_q)I_s^2 \sin 2\gamma$$

The output power can be evaluated by measuring the torque at a given speed. The torque equation is a function of the open circuit voltage, the armature current, and a saliency ($X_d - X_q$). Two components of the torque can be identified, a field torque component, $E_i I_s \cos\gamma$, which is a result of an interaction between stator 102 and the rotor field, and a reluctance torque component, $0.5(X_d - X_q)I_s^2 \sin 2\gamma$, which arises from the saliency of the machine.

In general, a polarity of the saliencies $X_d - X_q$ of a salient pole WFSM is opposite to that of a salient pole PM design. For a salient pole WFSM, $X_q$ is smaller than $X_d$ because the salient pole structure has more air space at a rotor slot opening. Part of the q-axis flux needs to traverse the rotor interpolar part to make a full flux linkage loop. Hence, the effective air gap on the q-axis flux path is enlarged by having slotting effects both from stator 102 and rotor 104. On the other hand, the d-axis flux path is made of iron (or other suitable material) on a solid rotor structure, where an effective air gap only needs to consider stator slotting. As a result, the saliency $X_d - X_q$ is positive. The reluctance torque is small or sometimes negligible due to the small saliencies of a conventional rotor structure.

Figure 6:
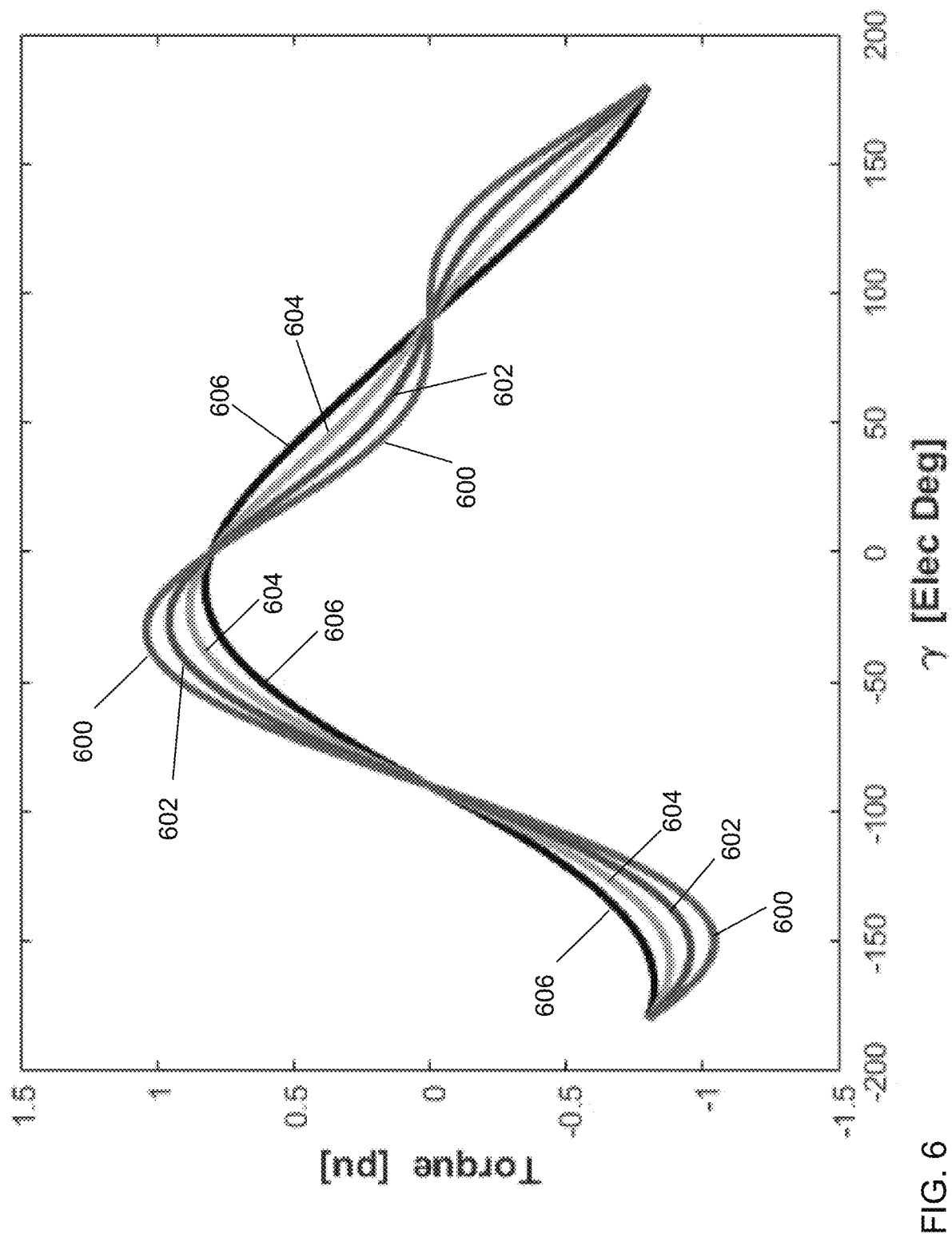
FIG. 6 depicts a total output torque versus a torque angle for different saliency designs using the salient pole WFSM of FIG. 1 in accordance with an illustrative embodiment.

For a given load condition, reluctance power can potentially be an important output power component of WFSMs as its saliencies increases beyond that normally encountered using WFSM 100. FIG. 6 shows curves of an output torque, as a function of current angle γ, and the saliencies $X_d - X_q$ (assuming $X_d$ is fixed) for rated speed operation with 1 pu line current and 0.8 pu open circuit voltage (same field current for fixed $X_d$). A first curve 606 represents the output torque as a function of current angle γ for $X_d - X_q$=0.2 pu. A second curve 604 represents the output torque as a function of current angle γ for $X_d - X_q$=0.4 pu. A third curve 602 represents the output torque as a function of current angle γ for $X_d - X_q$=0.6 pu. A fourth curve 600 represents the output torque as a function of current angle γ for $X_d - X_q$=0.8 pu. A maximum output torque can be achieved by choosing an optimum current angle γ' for the given current amplitude at each saliency level. This peak value increases monotonically as the saliency varies from 0.2 pu to 0.8 pu. At the same time, the optimum current angle, γ', rotates backward from −12.6° to −30.6°. As a result, more power can be produced in a WFSM by improving the saliency without the need to increase the current or to introduce any additional copper loss in stator 102 or rotor 104.

Considering $X_d - X_q$=0.4 pu and $X_d - X_q$=0.8 pu, as the field torque varies with cos(γ), it reaches its maximum at γ=0°. For the reluctance torque component, it is proportional to the product of $X_d - X_q$ and sin 2γ, since $X_d - X_q$ is positive, the reluctance torque is positive for −45°<γ<0°. The larger saliency design has greater amplitude in reluctance torque, while both designs reach their maximum reluctance torque at γ=−45°. As a result, a large saliency design can produce more total output power due to better reluctance power generation capability. As the saliency increases, the reluctance torque weighs more heavily in the total output torque generation. The optimum current angle γ' also rotates away from where the maximum field torque operating point γ=0° is achieved to that which is close to the maximum reluctance torque operating point γ=−45°.

Figure 7:
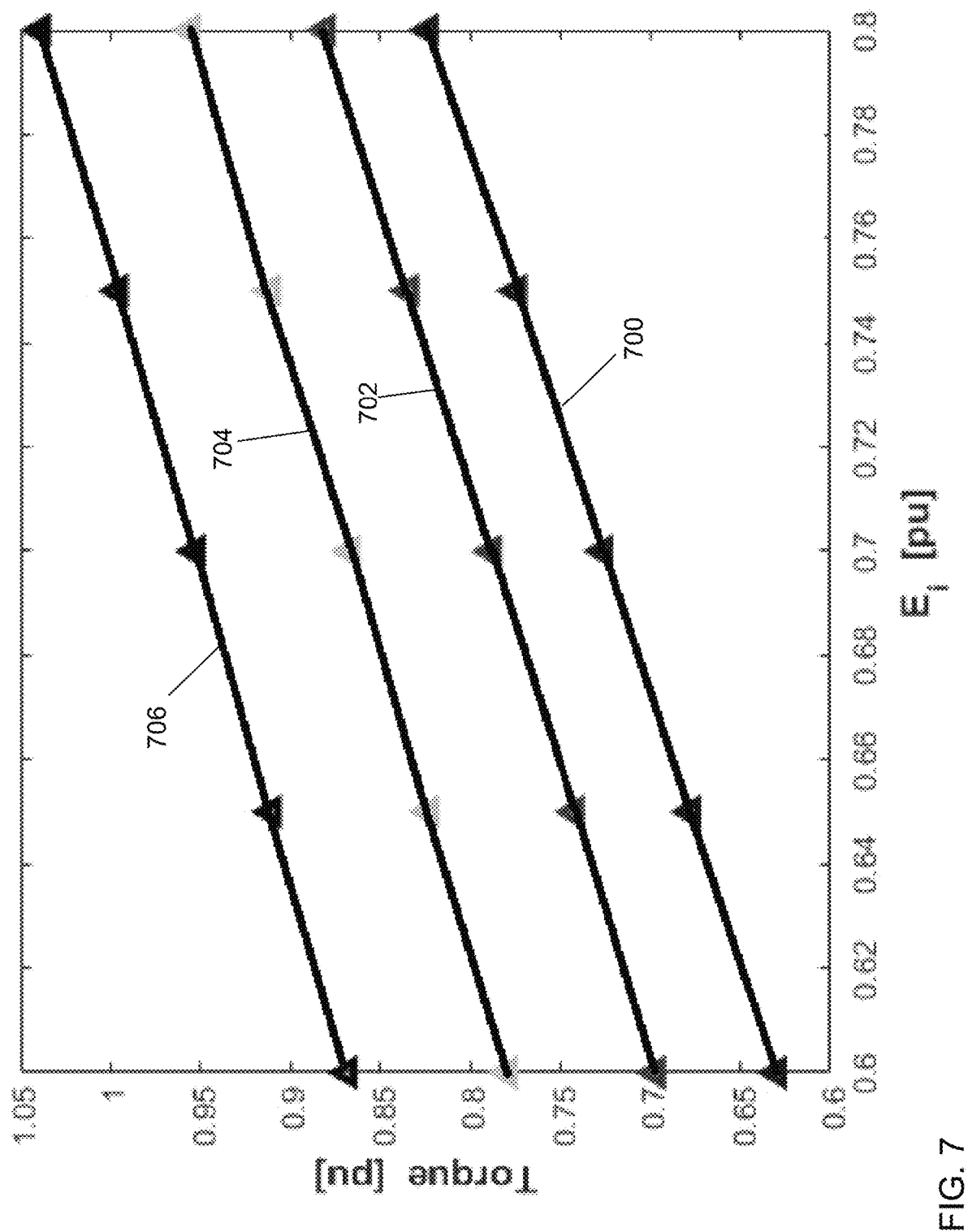
FIG. 7 depicts a comparison of a maximum torque for the different saliency designs as back electromotive force varying using the salient pole WFSM of FIG. 1 in accordance with an illustrative embodiment.

An alternative design approach is shown in FIG. 7 where different saliency levels are reached as $X_d$ changes. The open circuit voltage varies in accordance with $X_{ad}$ if the field current is constant. Maximum available torque is compared in this plot between different saliency levels as $E_i$ varies. A first curve 700 represents the output torque as a function of $E_i$ for $X_d - X_q$=0.2 pu. A second curve 702 represents the output torque as a function of $E_i$ for $X_d - X_q$=0.4 pu. A third curve 704 represents the output torque as a function of $E_i$ for $X_d - X_q$=0.6 pu. A fourth curve 706 represents the output torque as a function of $E_i$ for $X_d - X_q$=0.8 pu. The results indicate that large saliency and large open circuit voltage $E_i$ are preferred for torque production providing a guideline for saliency enhancement in WFSM design, namely, to maximize torque capability, $X_{ad}$ or open circuit voltage should be preserved as the saliency increases.

Figure 8:
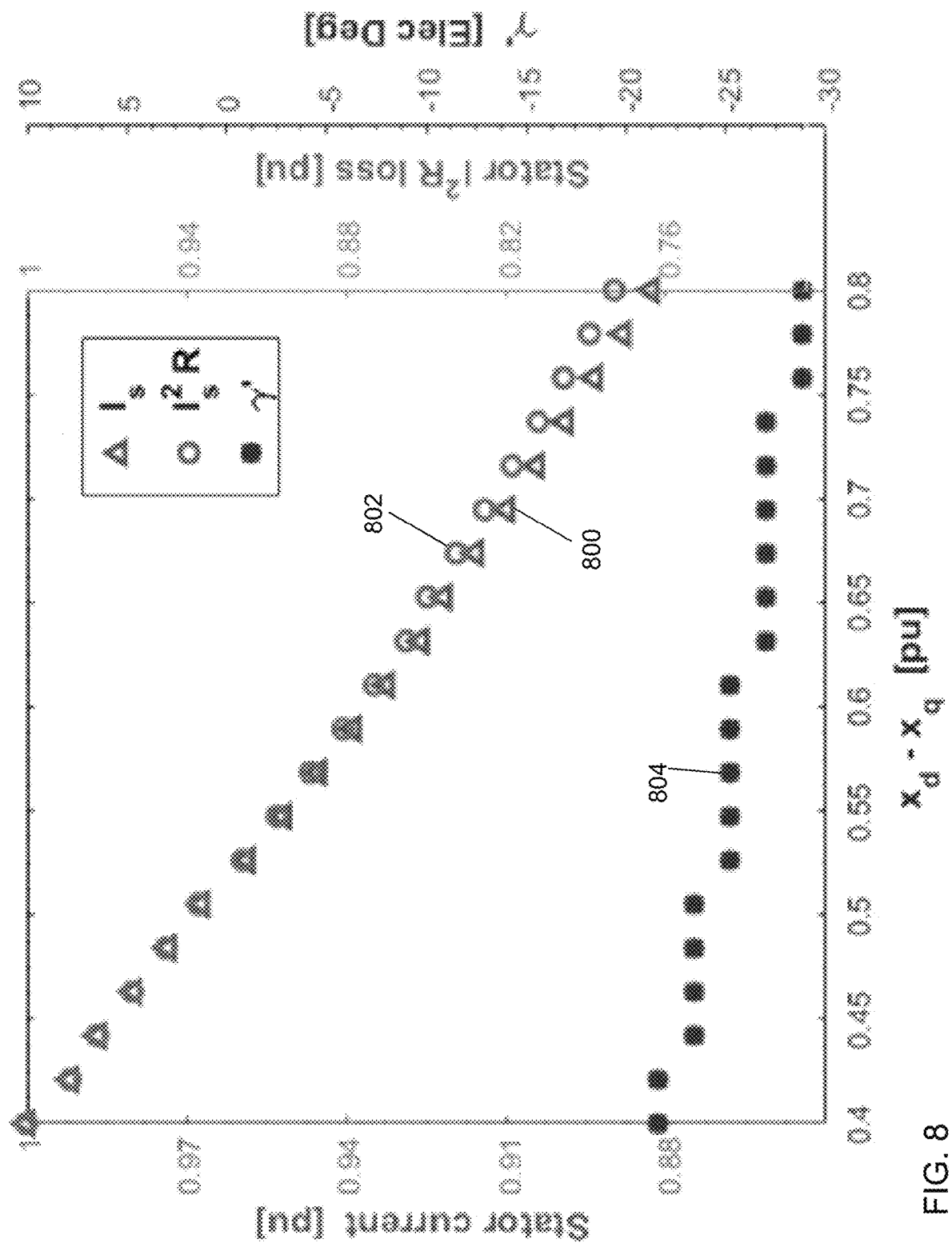
FIG. 8 depicts a stator current, a stator ohmic loss, and an optimum torque angle comparison for a given output torque using the salient pole WFSM of FIG. 1 in accordance with an illustrative embodiment.

In motor operation beyond rated speed, the field current of a WFSM can be reduced as speed increases and torque requirements decrease to maintain good efficiency and satisfactory constant power speed range within the controller voltage limit. A large saliency design can further reduce the losses in the machine and improve the overall efficiency. FIG. 8 shows a required stator current for different saliency designs (fixed $X_d$=1.2 pu and $E_i$=0.8 pu) to produce the same amount of torque. A first curve 800 shows the stator current $I_s$ as a function of the saliencies. A second curve 802 shows a stator loss $I_s^2 R$ as a function of the saliencies. A third curve 802 shows the optimum current angle γ' as a function of the saliencies. Compared to a design with $X_d - X_q$=0.4 pu operating at 1 pu current, first curve 800 suggests that less current is needed as saliency increases. Up to 11% of the stator current could be saved, corresponding to 20% of the stator ohmic losses when the saliency is improved from 0.4 pu to 0.8 pu. Though the stator current is reduced, the optimum current angle γ' still rotates towards the maximum reluctance torque operating point γ=−45° as saliency increases.

The concept of saliency enhancement is, as suggested by its name, to enlarge the difference between the q-axis and the d-axis reactance: $X_d - X_q$. For WFSMs, it is desirable to design the magnetic paths to have low permeability on the q-axis, thus further lowering the q-axis reactance, while keeping the d-axis reactance unchanged as much as possible.

In this case, the effect on open circuit voltage is minimized. As a result, the total output power can be improved with increasing reluctance power. However, it becomes challenging to design a WFSM with large saliency, because the q-axis and the d-axis flux paths in WFSMs are cross-coupled on stator 102 and rotor 104. The flux on the q-axis and the d-axis rotate along with the load current based on a stator fundamental frequency. As a result, any design modifications made on rotor 104 tend to affect both the q-axis and the d-axis flux paths.

Figure 22:
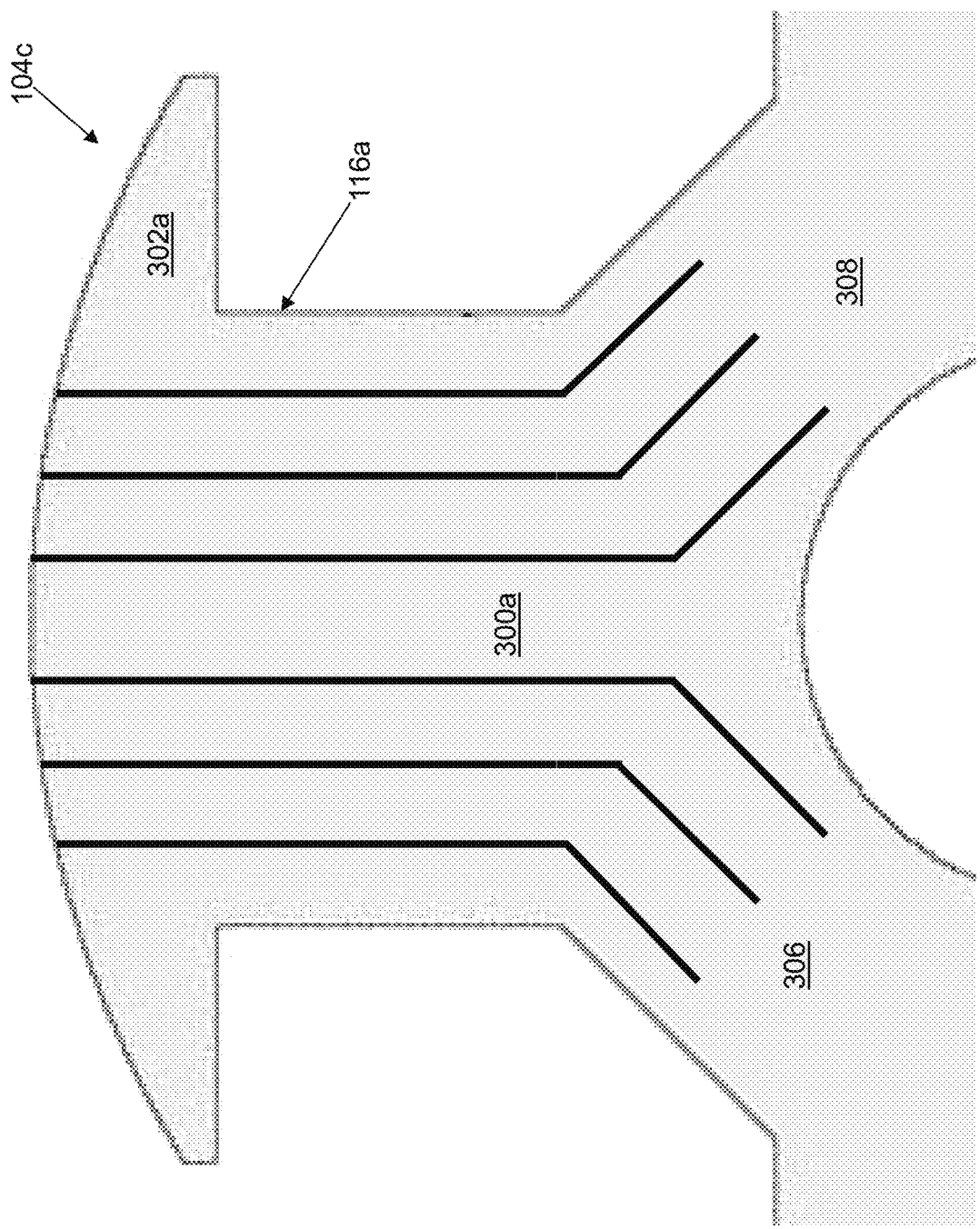
FIG. 22 depicts a zoomed back view of a portion of a rotor of a salient pole WFSM with a flux barrier in accordance with a second illustrative embodiment.
Figure 23:
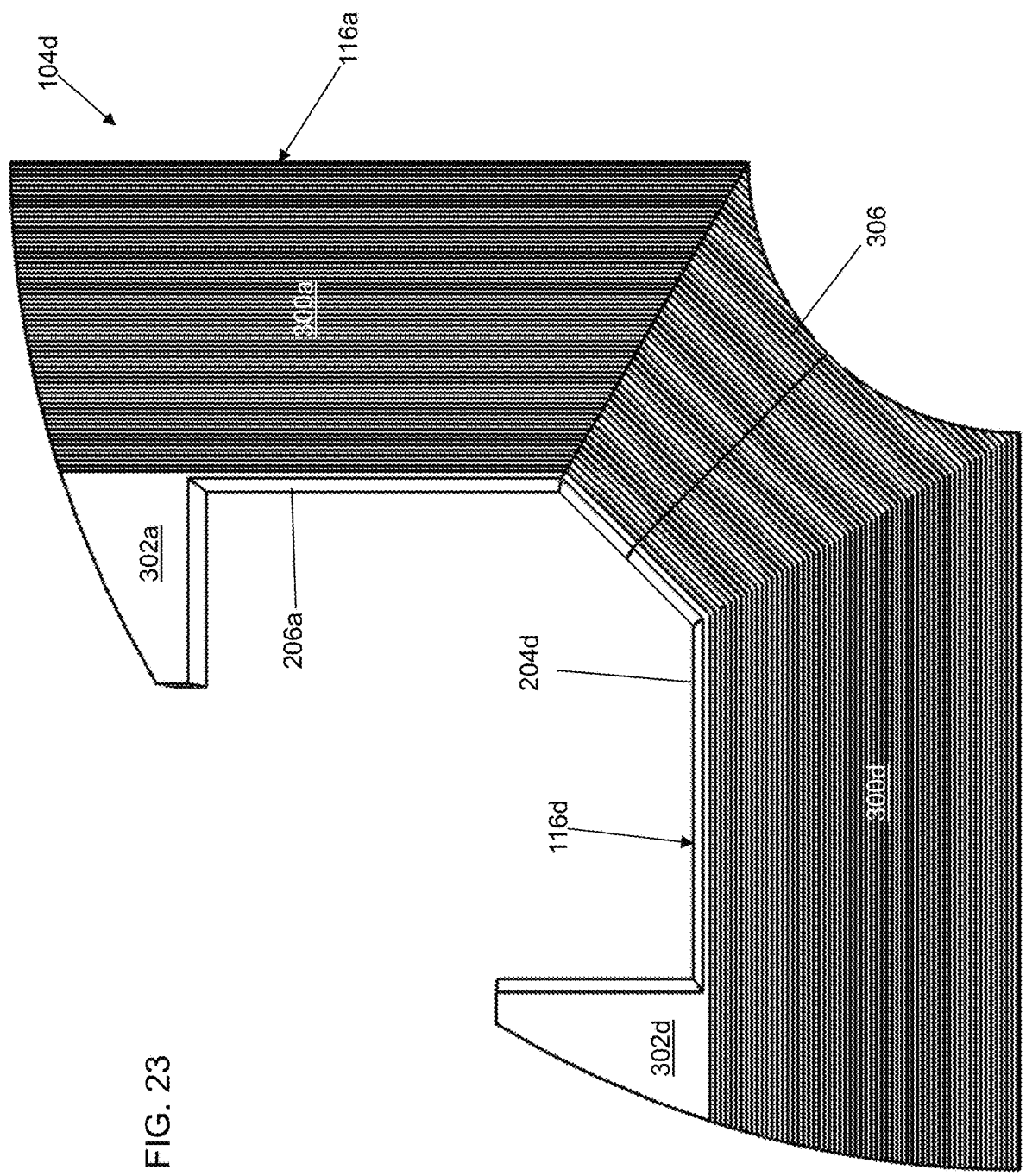
FIG. 23 depicts a zoomed back view of a portion of a rotor of a salient pole WFSM with a flux barrier in accordance with a third illustrative embodiment.

In general, flux barriers on WFSMs can be categorized into three designs: single barrier (SB), multi-layer barrier (MLB), and axial laminated (AL). FIG. 9 shows a front view of an illustrative rotor pole design for using a SB design. FIG. 22 shows an illustrative rotor pole design for using a MLB design. FIG. 23 shows an illustrative rotor pole design for using a AL design. The shape details of first tip 220a, 220b, 220c and second tip 222a, 222b, 222c are ignored herein. Though different in shape, a flux barrier of all three structures is designed to be parallel to the rotor d-axis and perpendicular to the q-axis, so that the flux on the d-axis is kept unaffected as much as possible, and the flux on the rotor q-axis is blocked by a barrier. The barrier may be formed of various materials that are insulators (a low electrical conductivity) having a low magnetic permeability, ideally with a relative magnetic permeability approximately equal to one relative to the permeability of a vacuum though an insulating material with a relative magnetic permeability between approximately zero and approximately 1000 relative to a vacuum has a sufficiently low magnetic permeability. Illustrative materials include plastic such as a polyester film such as a Mylar® film produced by Dupont Teijin Films, a polyimide film such as Kapton® film or paper produced by E. I. du Pont de Nemours, an aromatic polyamide such as Nomex® paper produced by E. I. du Pont de Nemours, polyvinylcloride, air, paint with a similar magnetic permeability, etc. The relative magnetic permeability of these materials is typically between one and two, the relative magnetic permeability being a ratio of the magnetic permeability of the material in question divided by the magnetic permeability of a vacuum. As understood by a person of skill in the art, the permeability of a vacuum is also known as the magnetic permeability of free space and is defined as $\mu_0 = 4\pi \times 10^{-7}$ Newtons/Amperes$^2$ (N/A$^2$).

A comparison between the electromagnetic characteristics between the three designs is listed in Table I below.

TABLE I

|  | Axial Lamination | Multi-layer Barrier | Single Barrier |
| --- | --- | --- | --- |
| Iron Loss | High | Low | Low |
| Air gap Flux | Smoothest | Smooth | Least Smooth |

Among these three structures, the AL design may be the most difficult to manufacture and assemble because its laminations have many different shapes, although the even spaced lamination insulation barriers can provide the smoothest air gap flux. The AL design may also generate the most iron losses. The MLB and SB both use low permeability slits as the flux barrier. The SB design may be the easiest and cheapest to manufacture based on a uniform lamination design, although it may provide the least smooth air gap flux.

Figure 10:
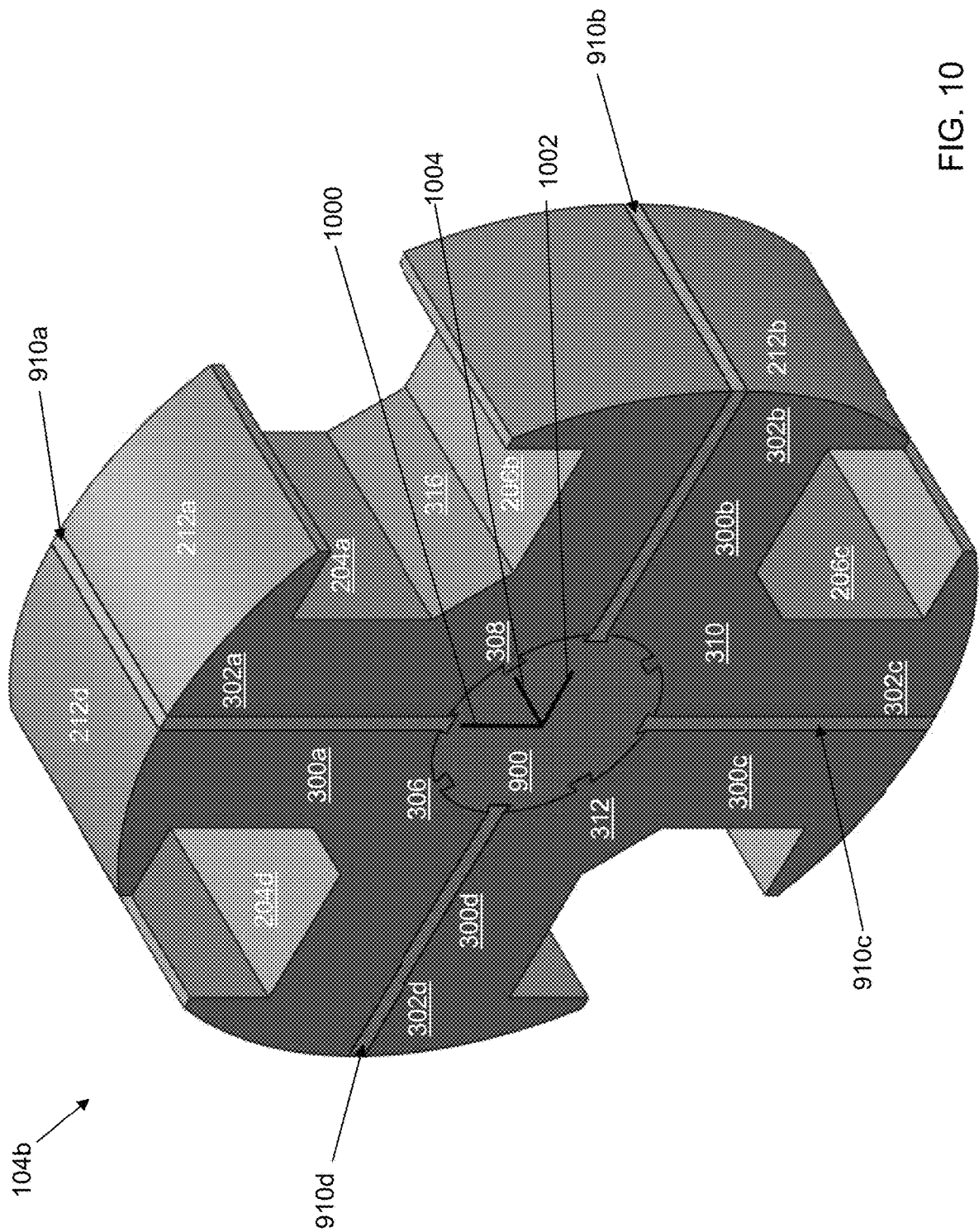
FIG. 10 depicts a perspective view of the rotor of FIG. 9 in accordance with a first illustrative embodiment.

Referring to FIG. 9, a front view of a third rotor 104b is shown in accordance with an illustrative embodiment. Referring to FIG. 10, a perspective view of third rotor 104b is shown in accordance with an illustrative embodiment. Third rotor 104b is mounted to a shaft 900. For illustration, first core front face portion 918 may include a first dovetail 902 to mount to shaft 900. Second core front face portion 920 may include a second dovetail 904 to mount to shaft 900. Third core front face portion 922 may include a third dovetail 906 to mount to shaft 900. Fourth core front face portion 924 may include a fourth dovetail 908 to mount to shaft 900.

Third rotor 104b is identical to second rotor 104a except that third rotor 104b includes a single flux barrier 904 embedded in a radial center of each of the plurality of pole bodies 116. First pole body 116a may include a first flux barrier 910a. First flux barrier 910a extends through a radial center of first pole core 118a and first pole shoe 120a between first pole shoe front face 208a and first pole shoe back face 302a. First flux barrier 910a is further positioned halfway between first pole shoe right face 210a and first pole shoe left face 214a, halfway between first pole core right face 204a and first pole core left face 206a, and extends from first pole shoe arc face 212a to rotor shaft face 114.

First flux barrier 910a may include a first plurality of interior walls 912a, a first top wall 914a, and a first shaft mounting wall 916a that form an enclosed space that may be filled with the insulating material having a low relative magnetic permeability. First shaft mounting wall 916a may form a dovetail to mount first flux barrier 910a to shaft 900. Similarly, second pole body 116b may include a second flux barrier 910b; third pole body 116c may include a third flux barrier 910c; and fourth pole body 116d may include a fourth flux barrier 910d. Second flux barrier 910b, third flux barrier 910c, and fourth flux barrier 910d are identical in shape and composition and mounted in an identical position relative to second pole body 116b, third pole body 116c, and fourth pole body 116d, respectively, as first flux barrier 910a.

FIG. 10 shows a first axis 1000 that is parallel to a radial center of first pole body 116a; a second axis 1002 that is parallel to a radial center of second pole body 116b and perpendicular to first axis 1000; and a third axis 1004 that is perpendicular to first axis 1000 and to second axis 1002 and parallel to an axial center of third rotor 104b.

Figure 11:
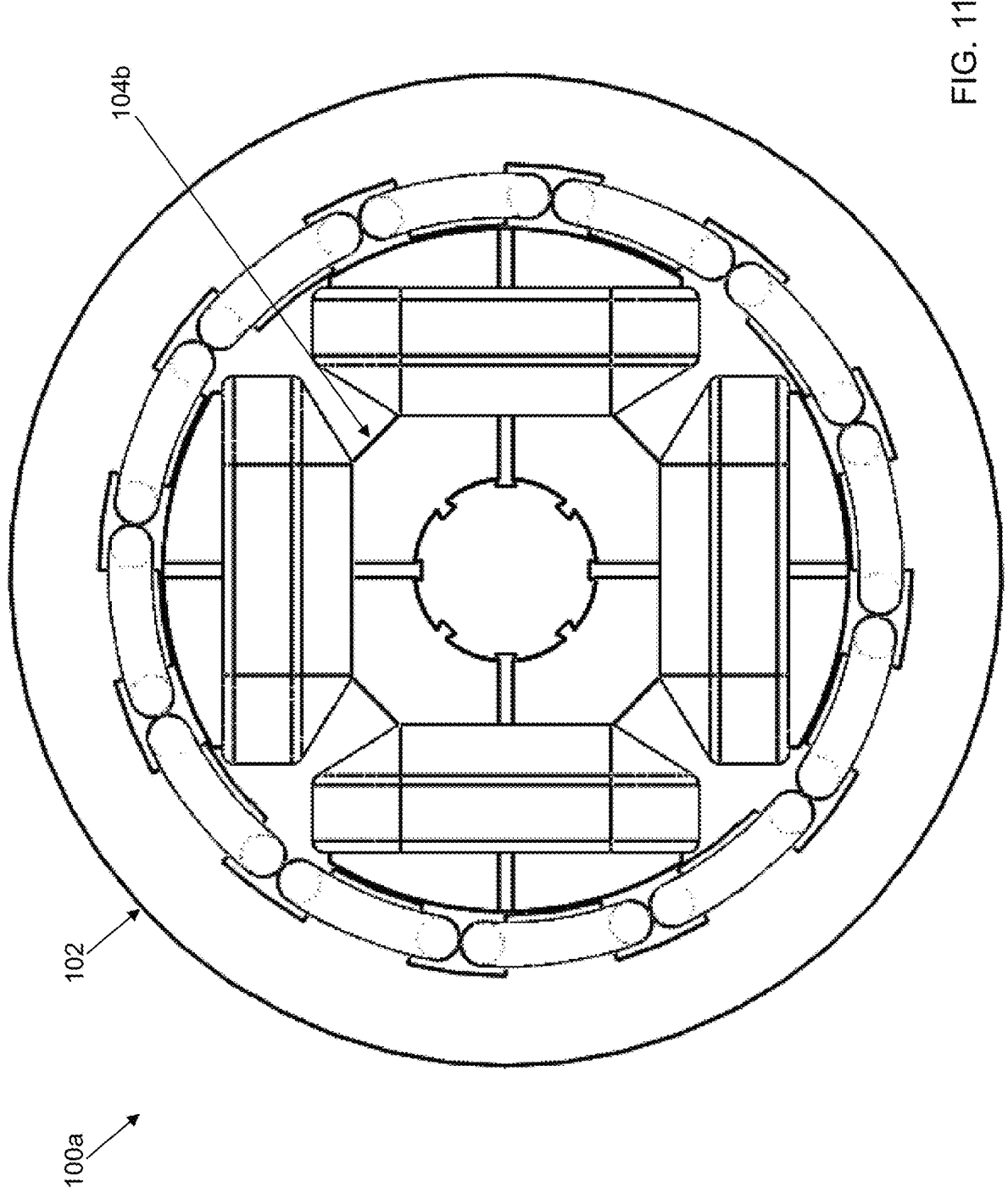
FIG. 11 depicts a front view of a salient pole, wound field, synchronous machine (WFSM) with the rotor of FIG. 10 in accordance with an illustrative embodiment.
Figure 12:
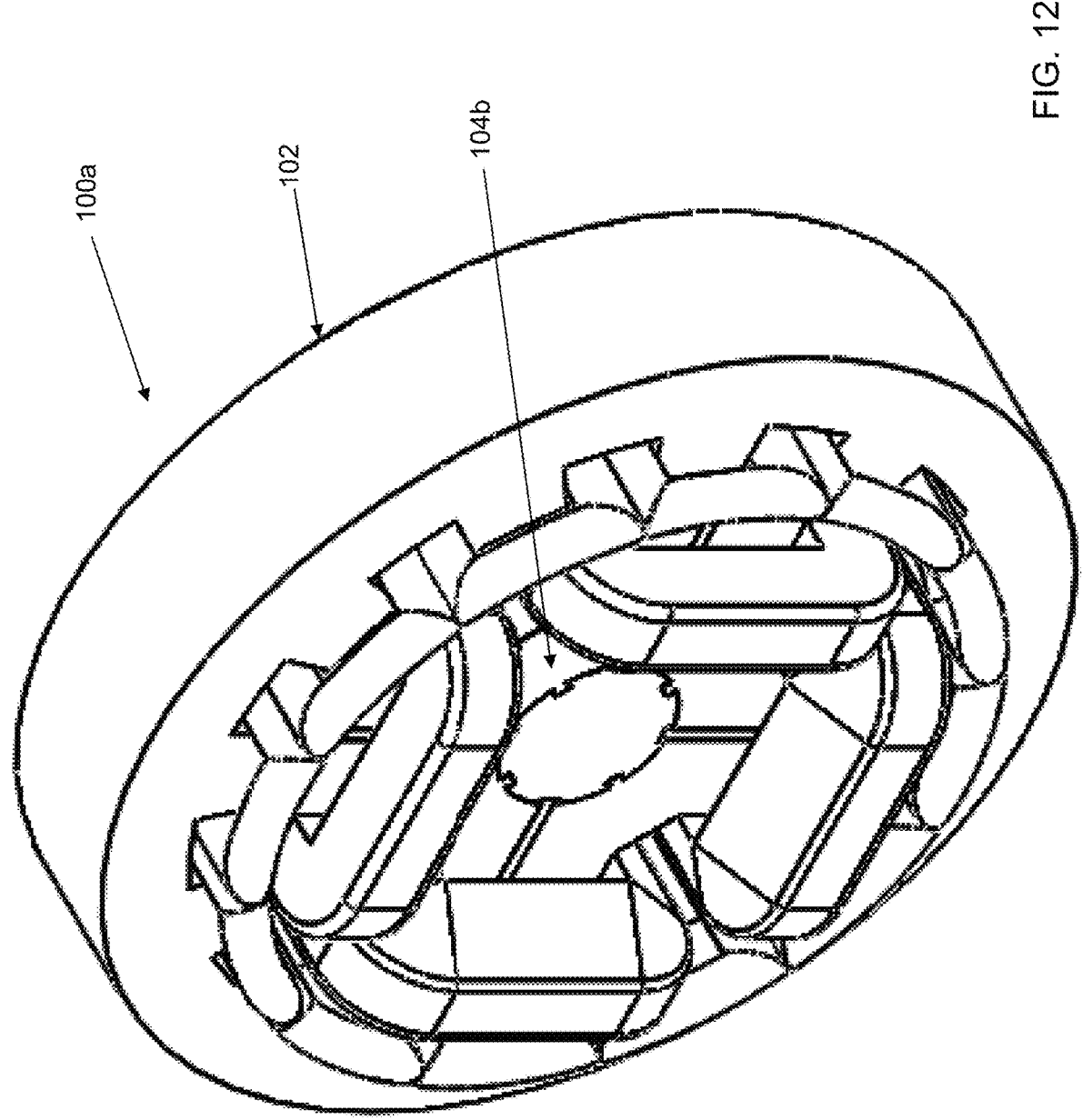
FIG. 12 depicts a perspective view of the salient pole WFSM of FIG. 11 in accordance with an illustrative embodiment.

Referring to FIG. 11, a front view of a second salient pole WFSM 100a is shown in accordance with an illustrative embodiment. Referring to FIG. 12, a perspective view of second salient pole WFSM 100a is shown in accordance with an illustrative embodiment. Second salient pole WFSM 100a may include stator 102 and third rotor 104b.

A flux barrier width $W_{fb}$ between the first plurality of interior walls 912a of first flux barrier 910a, a second plurality of interior walls 912b of second flux barrier 910b, a third plurality of interior walls 912c of third flux barrier 910c, and a fourth plurality of interior walls 912d of fourth flux barrier 910d may be selected by keeping the magnetizing reactance $X_{ad}$ or open circuit voltage $E_i$ unchanged. To avoid introduction of a vulnerability to saturation due to saliency, the rotor pole width should be increased by the same flux barrier width $W_{fb}$ to keep the core volume the same as a base design. Each rotor pole width extends parallel to either first axis 1000 or second axis 1002. For illustration, the rotor pole width of first flux barrier 910a is parallel to second axis 1002; whereas, the rotor pole width of second flux barrier 910b is parallel to first axis 1000. Each of first flux barrier 910a, second flux barrier 910b, third flux barrier 910c, and fourth flux barrier 910d extends from shaft 900 through a center of each pole body of the plurality of pole bodies 116 in a radial direction perpendicular to third axis 1004 and in an axial direction parallel to third axis 1004.

Again, third rotor 104b may include a fewer or a greater number of the plurality of pole bodies 116, where each pole body includes an identical flux barrier 910. Each flux barrier 910 can be made of identical lamination pieces with flux barriers in the center of each rotor pole body 116, or can be made of solid bars in the axial direction parallel to third axis 1004. For example, solid bars may be preferable in large high speed generators. The dovetails may assist in stacking and holding laminations together with the flux barriers on shaft 900.

The design parameter $W_{fb}$ may be tuned by keeping the magnetizing reactance $X_{ad}$ or open circuit voltage $E_i$ unchanged. To avoid introducing a vulnerability to saturation due to saliency, the rotor pole span should be increased by the same flux barrier width $W_{fb}$ to keep the core volume the same as a base design. Because $$\lambda_d = L_{ad}I_f + L_d I_d = L_{ad}I_f + (L_{ad}+L_{ls})I_d \quad (8)$$

$$\lambda_q = L_q I_q \quad (9)$$

the saliency can be evaluated for different $W_{fb}$ widths by checking corresponding dq-axis flux plots. $L_{ls}$, $L_{ad}$, $L_d$, and $L_q$ are leakage, magnetizing, d-axis and q-axis inductance respectively. $L_{ad}$, $L_d$, and $L_q$ can be converted to $X_{ad}$, $X_d$, and $X_q$ easily with the same proportionality constant.

Figure 13:
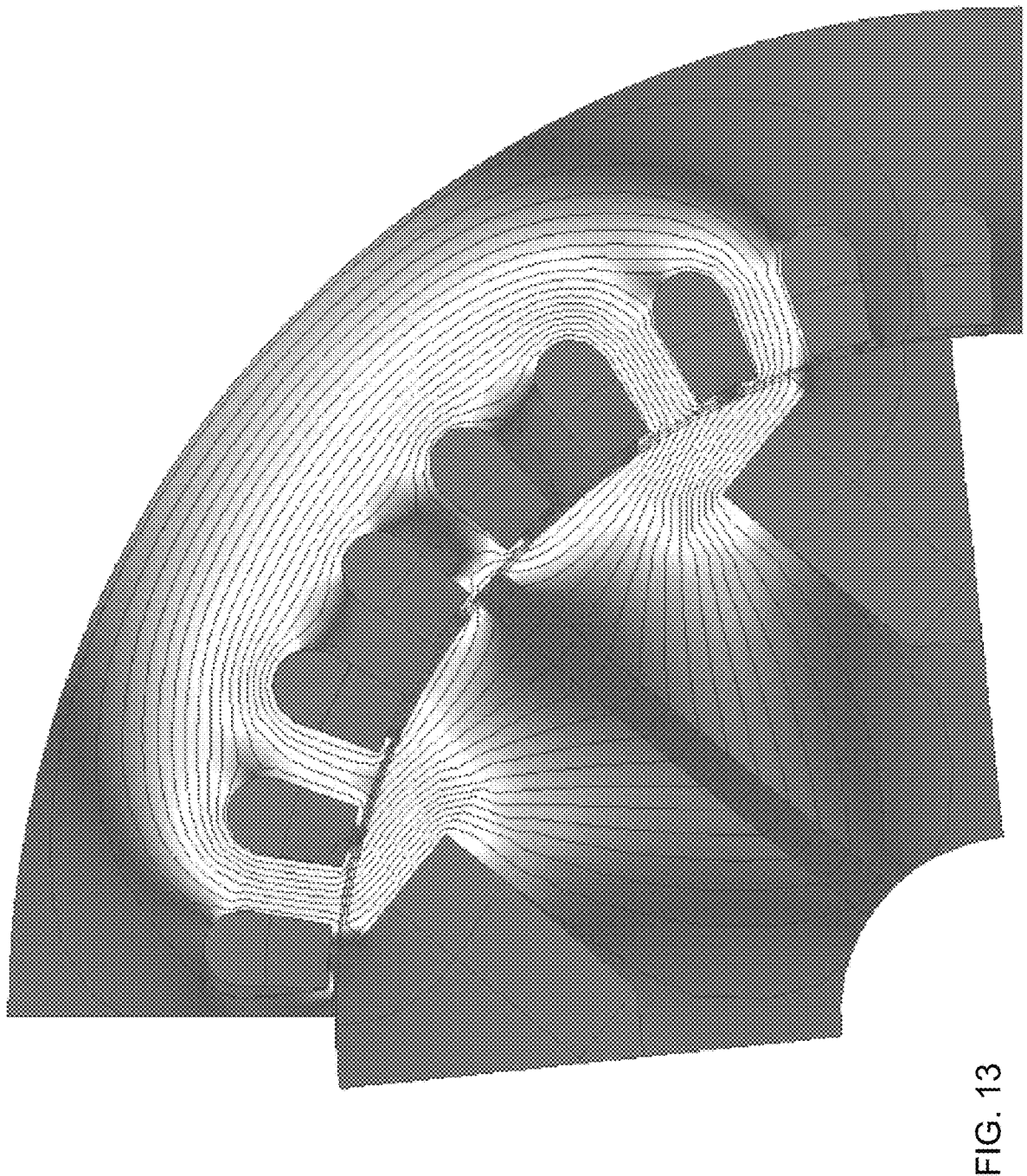
FIG. 13 depicts a q-axis flux density distribution using the salient pole WFSM of FIG. 11 in accordance with an illustrative embodiment.

FIG. 13 shows the q-axis flux distribution and flux lines of a single barrier design $W_{fb}=0.1\ W_{r\_pb}$, where $W_{r\_pb}$ is a width of each pole core 118 in an initial design. For example, $W_{r\_pb}$ is a width of each pole core 118 in second rotor 104. A range of relative width values may be selected and performance evaluated to determine an "optimum" width value for flux barrier width $W_{fb}$. For example, the range may be 3% to 10% of the width of each pole core 118 in second rotor 104. When third rotor 104b is at a position where flux barrier 904 is aligned with a stator tooth, the q-axis flux lines close to the flux barrier tip form a zigzag leakage path. These flux lines find a low reluctance path even by passing through the air gap two more times, which limits the effective amount of flux lines going through the barrier structure. It can be expected that the leakage becomes worse as $W_{fb}$ increases.

Figure 14:
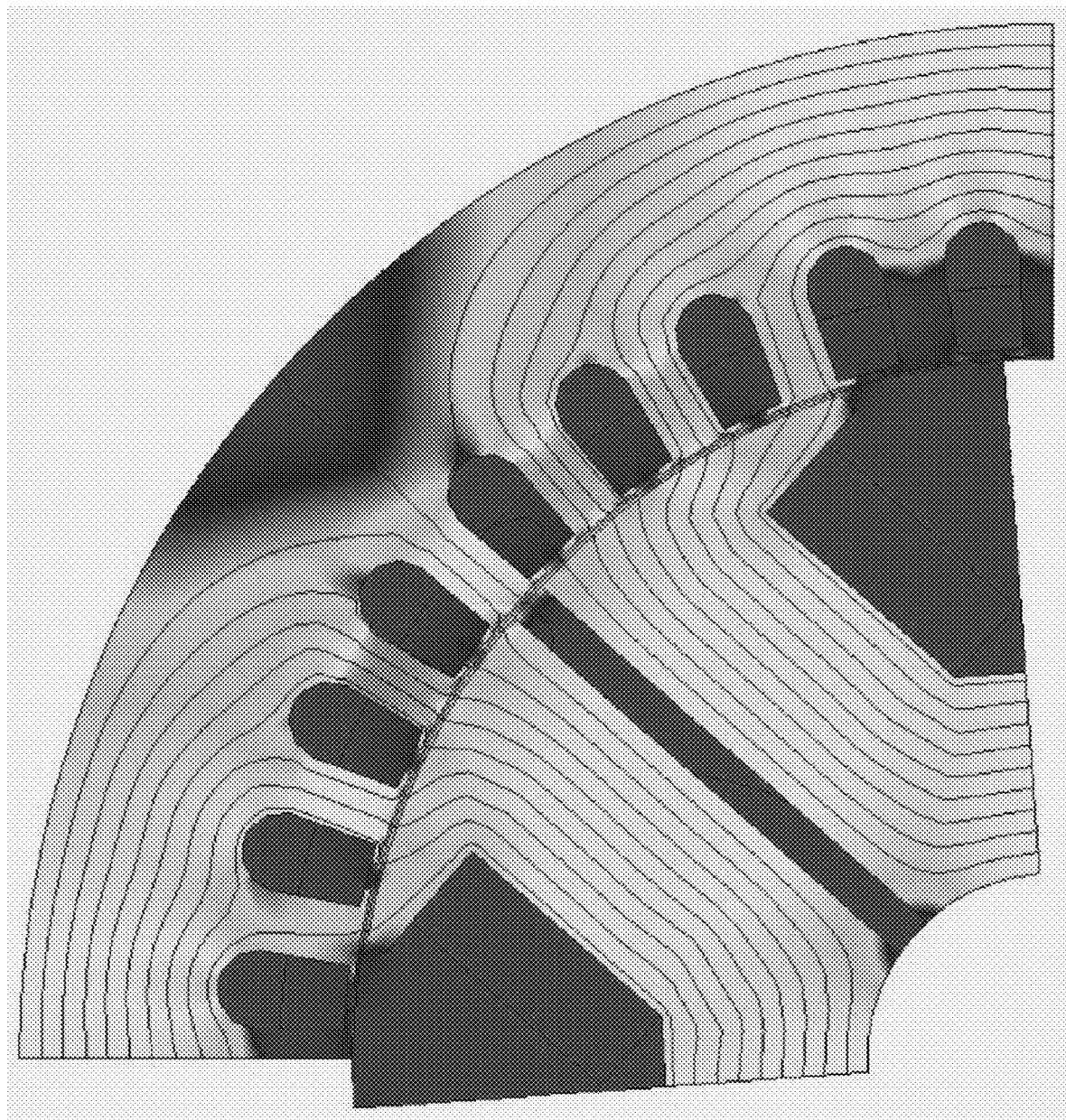
FIG. 14 depicts a d-axis flux density distribution using the salient pole WFSM of FIG. 11 in accordance with an illustrative embodiment.

FIG. 14 shows a d-axis flux distribution and flux lines of the single barrier design $W_{fb}=0.1\ W_{r\_pb}$. The d-axis flux path is also changed to some extent, as less flux passes through the stator teeth when a tooth is directly aligned with flux barrier 910. If $W_{fb}$ continues to increase such that $W_{fb}$ extends a length of the tooth face of the plurality of teeth 108 of stator 102, the tooth may be short circuited, making the effective d-axis circumferential flux path on the stator side reduced by one tooth in a quarter model. The d-axis flux-linkage may become more prone to saturation and affect $X_{ad}$ under a high current excitation, which should be avoided. Thus, $W_{fb}=0.1\ W_{r\_pb}$ may be defined as an upper boundary, and a reasonable lower boundary may be chosen as $W_{fb}=0.03\ W_{r\_pb}$.

Figure 15:
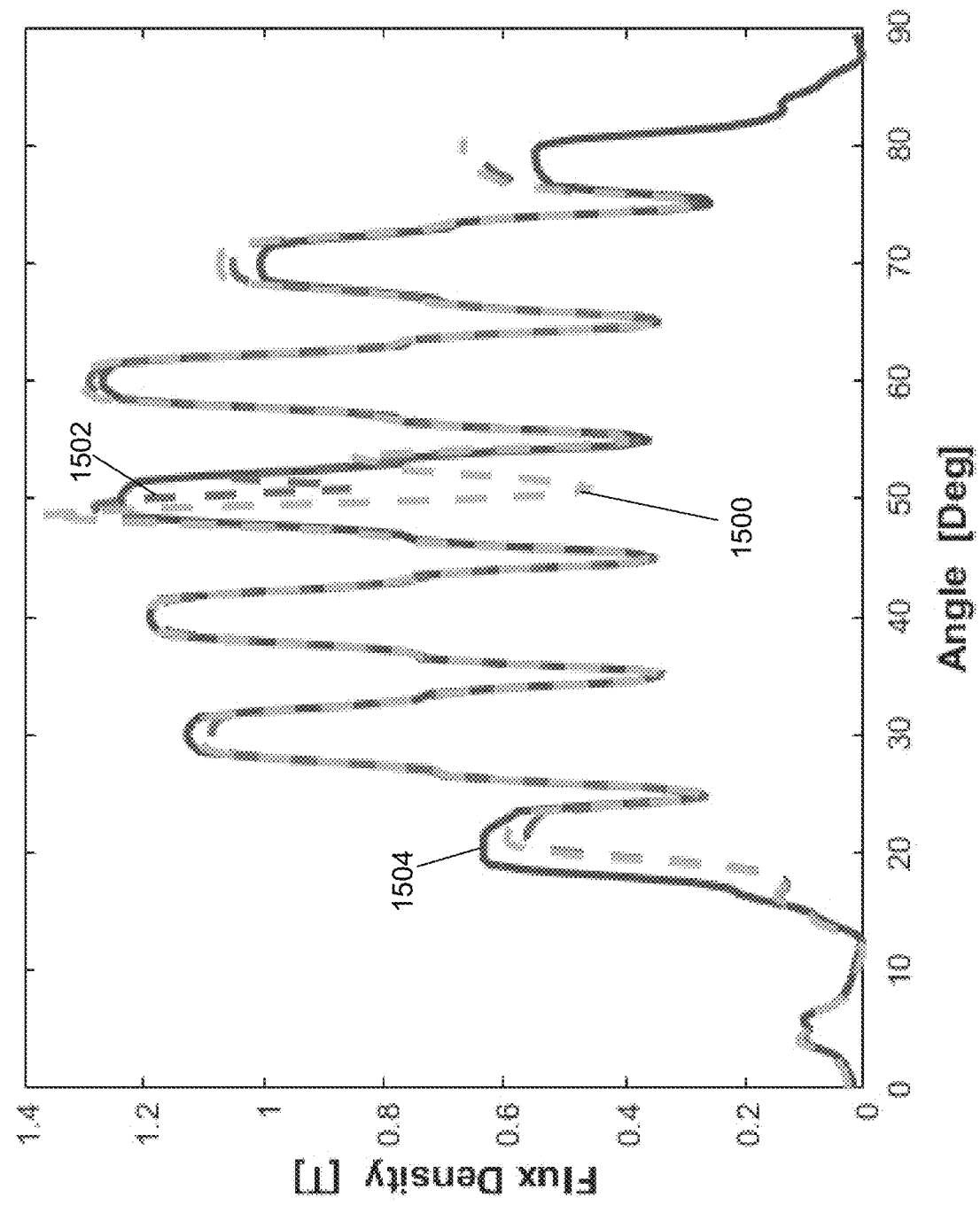
FIG. 15 depicts an air gap centerline d-axis flux density distribution for a rotor pole aligned to stator teeth using the salient pole WFSM of FIG. 11 with two different barrier widths in comparison to a conventional salient pole WFSM of FIG. 1 in accordance with an illustrative embodiment.

A summary of two barrier width designs at the selected tuning boundaries: $W_{fb}=0.1\ W_{r\_pb}$ and $W_{fb}=0.03\ W_{r\_pb}$ are shown in FIGS. 15-20. FIG. 15 shows the d-axis flux density distribution for a rotor pole centered between stator teeth using second salient pole WFSM 100a with $W_{fb}=0.1\ W_{r\_pb}$ (1500) and $W_{fb}=0.03\ W_{r\_pb}$ (1502) in comparison to salient pole WFSM 100 (1504) in accordance with an illustrative embodiment. A large dip can be observed on the d-axis flux distribution at the air gap centerline, for $W_{fb}=0.1\ W_{r\_pb}$ due to a flux partial short circuit. The phenomenon is less prominent for $W_{fb}=0.03\ W_{r\_pb}$.

Figure 16:
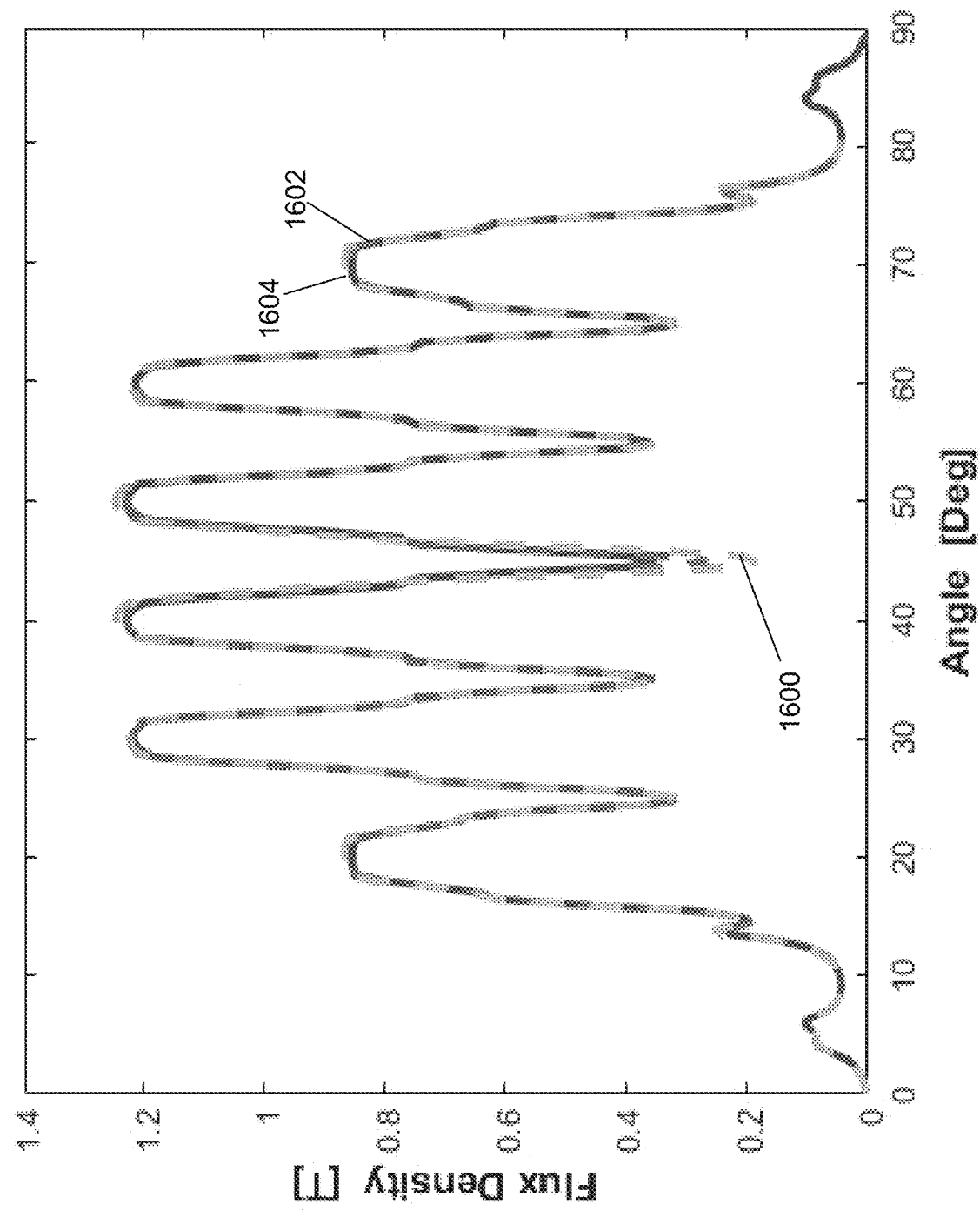
FIG. 16 depicts air gap centerline d-axis flux density distribution for a rotor pole aligned to stator slots using the salient pole WFSM of FIG. 11 with two different barrier widths in comparison to the conventional salient pole WFSM of FIG. 1 in accordance with an illustrative embodiment.
Figure 17:
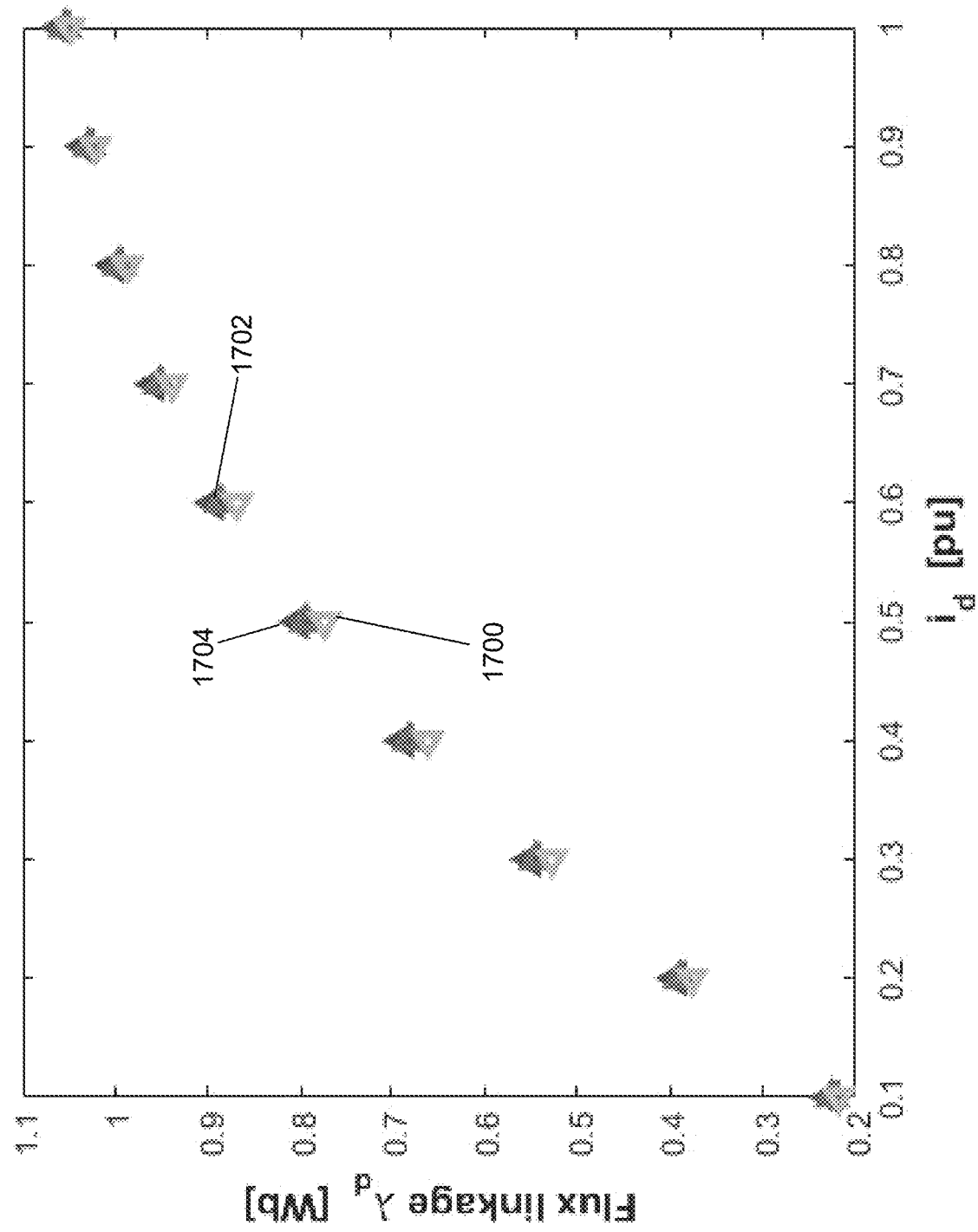
FIG. 17 depicts a d-axis stator winding flux linkage using the salient pole WFSM of FIG. 11 with two different barrier widths in comparison to the conventional salient pole WFSM of FIG. 1 in accordance with an illustrative embodiment.

FIG. 16 shows the d-axis flux density distribution for a rotor pole centered between stator slots using second salient pole WFSM 100a with $W_{fb}=0.1\ W_{r\_pb}$ (1600) and $W_{fb}=0.03\ W_{r\_pb}$ (1602) in comparison to salient pole WFSM 100 (1604) in accordance with an illustrative embodiment. FIG. 17 shows the d-axis stator winding flux linkage using second salient pole WFSM 100a with $W_{fb}=0.1\ W_{r\_pb}$ (1700) and $W_{fb}=0.03\ W_{r\_pb}$ (1702) in comparison to salient pole WFSM 100 (1704) in accordance with an illustrative embodiment.

Figure 18:
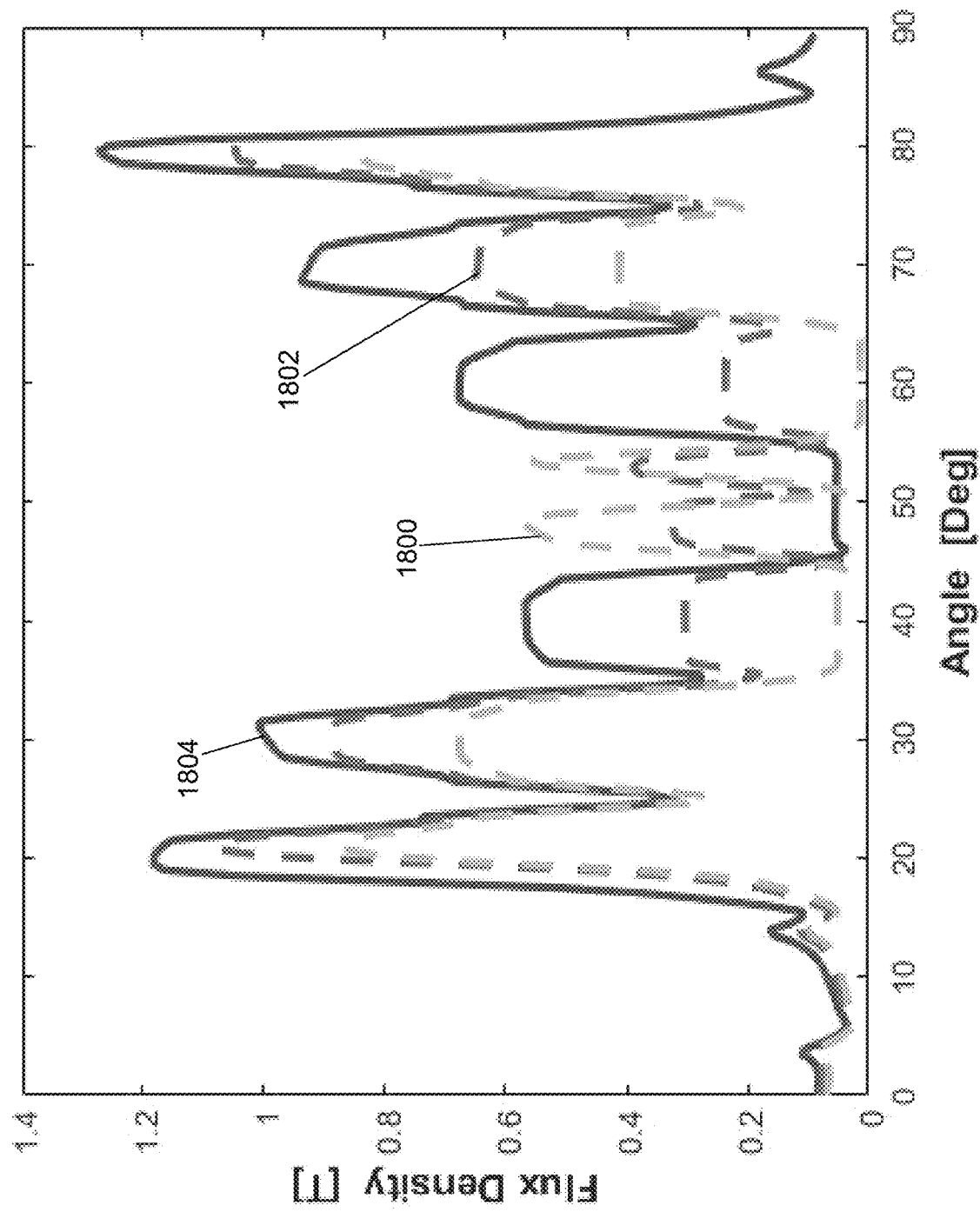
FIG. 18 depicts an air gap centerline q-axis flux density distribution for a rotor pole aligned to stator teeth using the salient pole WFSM of FIG. 11 with two different barrier widths in comparison to a conventional salient pole WFSM of FIG. 1 in accordance with an illustrative embodiment.
Figure 19:
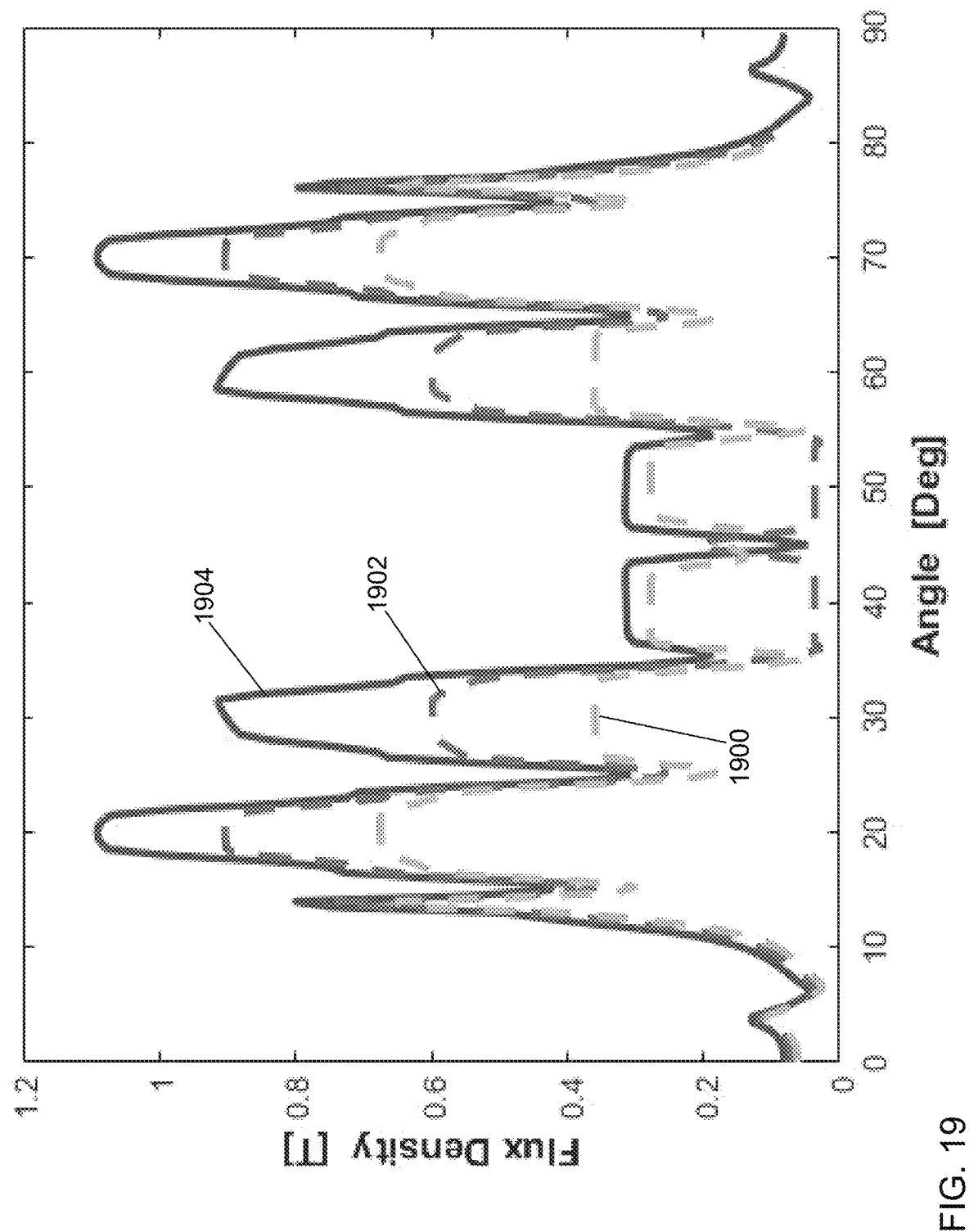
FIG. 19 depicts an air gap centerline q-axis flux density distribution for a rotor pole aligned to stator slots using the salient pole WFSM of FIG. 11 with two different barrier widths in comparison to the conventional salient pole WFSM of FIG. 1 in accordance with an illustrative embodiment.
Figure 20:
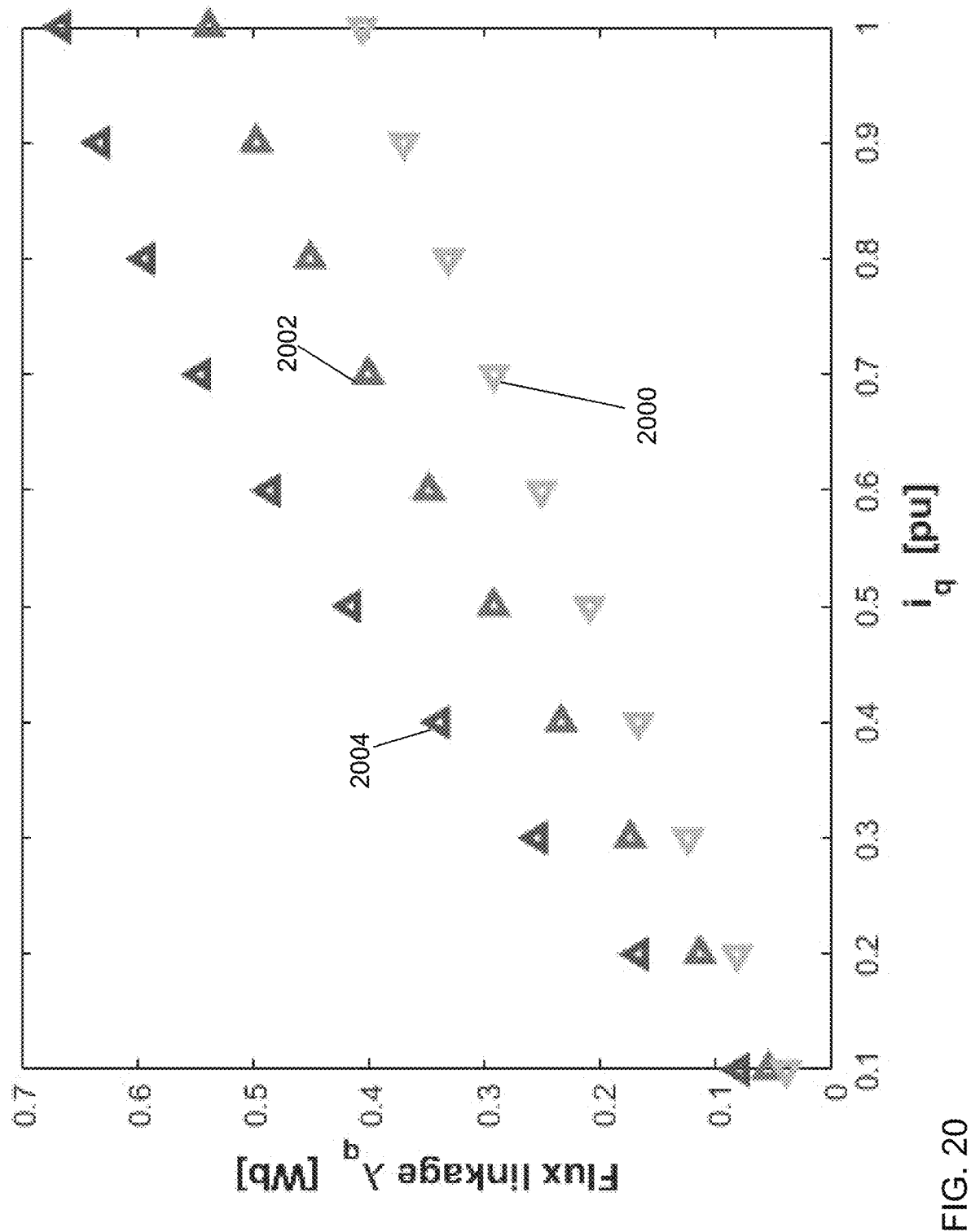
FIG. 20 depicts a q-axis stator winding flux linkage using the salient pole WFSM of FIG. 11 with two different barrier widths in comparison to the conventional salient pole WFSM of FIG. 1 in accordance with an illustrative embodiment.

FIG. 18 shows the q-axis flux density distribution for a rotor pole centered between stator teeth using second salient pole WFSM 100a with $W_{fb}=0.1\ W_{r\_pb}$ (1800) and $W_{fb}=0.03\ W_{r\_pb}$ (1802) in comparison to salient pole WFSM 100 (1804) in accordance with an illustrative embodiment. The q-axis flux is effectively blocked at the same rotor position except for some leakage flux. FIG. 19 shows the q-axis flux density distribution for a rotor pole centered between stator slots using second salient pole WFSM 100a with $W_{fb}=0.1\ W_{r\_pb}$ (1900) and $W_{fb}=0.03\ W_{r\_pb}$ (1902) in comparison to salient pole WFSM 100 (1904) in accordance with an illustrative embodiment. FIG. 20 shows the q-axis stator winding flux linkage using second salient pole WFSM 100a with $W_{fb}=0.1\ W_{r\_pb}$ (2000) and $W_{fb}=0.03\ W_{r\_pb}$ (2002) in comparison to salient pole WFSM 100 (2004) in accordance with an illustrative embodiment.

Figure 21:
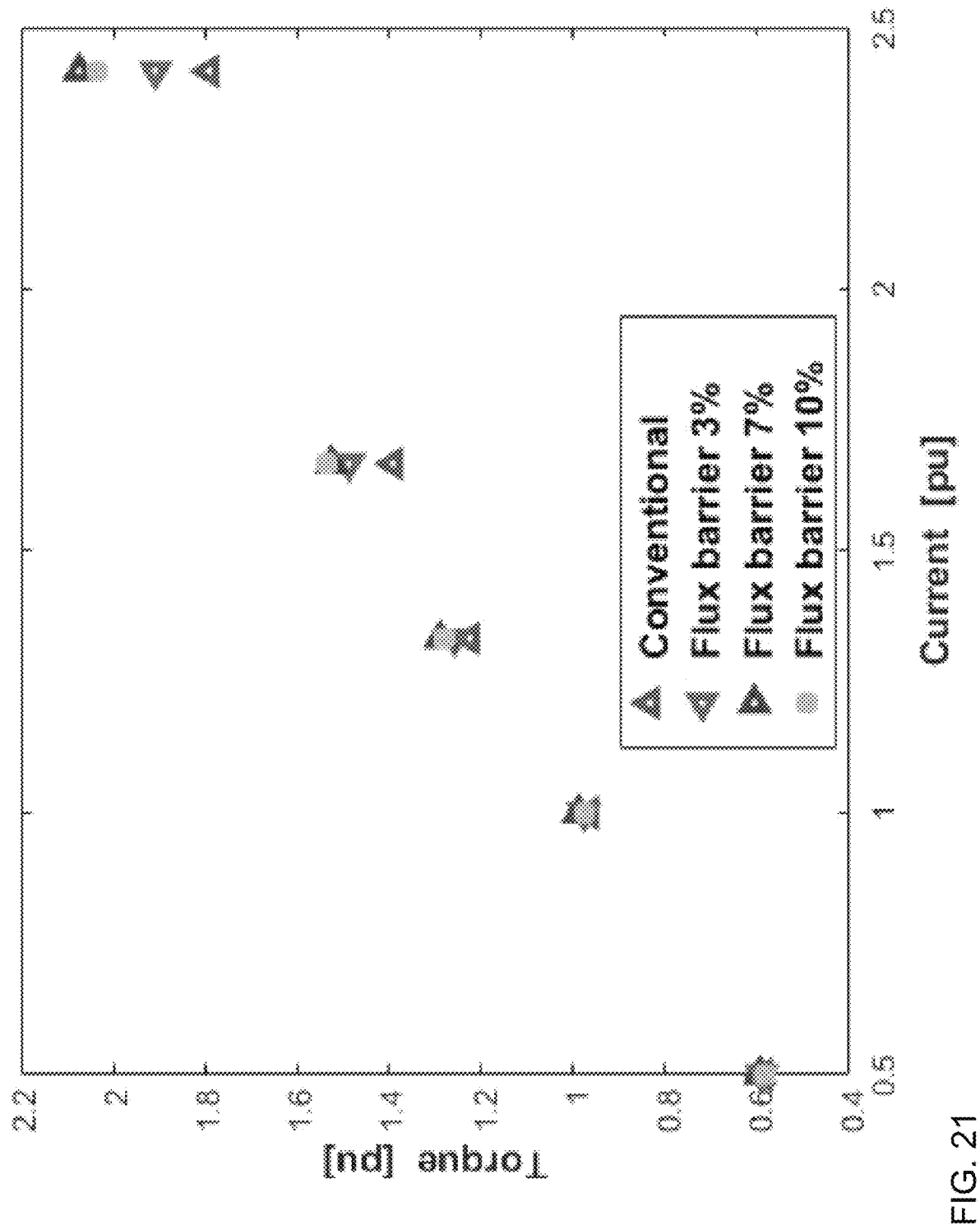
FIG. 21 depicts the average output torque using the salient pole WFSM of FIG. 11 with three different barrier widths in comparison to the conventional salient pole WFSM of FIG. 1 in accordance with an illustrative embodiment.

FIG. 21 shows the average output torque at rated operating condition using second salient pole WFSM 100a with $W_{fb}=0.1$ and $W_{r\_pb}$ $W_{fb}=0.07\ W_{r\_pb}$, $W_{fb}=0.03\ W_{r\_pb}$ in comparison to salient pole WFSM 100 (conventional) in accordance with an illustrative embodiment. The average torque improvement becomes apparent as the stator current increases, from a 2.3% percent improvement at 1 pu current to a 15.8% percent improvement at 2.5 pu current for $W_{fb}=0.07\ W_{r\_pb}$. Additional torque improvement can be obtained because reluctance torque increases along with $I_s^2$.

The d-axis flux is well preserved when the flux barrier aligns with the stator slot with both width designs. However, a small dip in the center can be observed for design $W_{fb}=0.1\ W_{r\_pb}$. The q-axis flux at this rotor position is also effectively blocked as shown in FIG. 19. The flux leakage and short circuit phenomena caused by the barrier and stator slots can be quantitatively assessed by looking at the average stator flux-linkage over one electric cycle in FIG. 17 and FIG. 20 for d-axis and q-axis respectively. The differentiated slope of flux-linkage along the d-axis or q-axis at certain operating points is an indication of the corresponding inductance. The inhibiting effects of the flux barrier design on the q-axis is easy to capture. The larger $W_{fb}$ design provides a smaller slope, which means a smaller q-axis inductance. The plots also suggest that the q-axis flux path saturation level is less prone to variations of current, as the flux barrier dominates the magnetic characteristics on this axis. However, though it is difficult to determine the difference between salient pole WFSM 100 and $W_{fb}=0.1\ W_{r\_pb}$ and $W_{fb}=0.03\ W_{r\_pb}$ for third rotor 104b, the average d-axis flux-linkage value is most reduced for $W_{fb}=0.1\ W_{r\_pb}$. Saturation can be clearly observed as the current increases.

$W_{fb}=0.07\ W_{r\_pb}$ was determined to be an "optimum" flux barrier width by selecting a parameter to maintain for an existing salient pole WFSM design such as the rated torque at rated speed, and to improve the torque under over rated speed region (rotor field excitation would be reduced according to the speed). The effective core volume should be retained to maintain the magnetizing reactance or open circuit voltage. The design of flux barrier width $W_{fb}$ may be done based on the choice of rotor pole body width and air gap length to control a magnetic short circuit and flux leakage. Sensitivity of the d-axis flux path saturation to current variation may be controlled with an optimum selection. A variety of widths are selected and evaluated to determine the optimum flux barrier width that maintains the selected performance parameter(s).

Within the voltage limit, total losses are reduced due to the fact that a reduced stator current may be used to produce the same amount of torque. For higher speed, total losses are further reduced. In particular, the eddy losses in stator 102 and third rotor 104b, stator hysteresis loss and stator copper loss are reduced due to the fact that less stator current is needed to produce the required torque. Less current leads to a lower flux level in second salient pole WFSM 100a, which is helpful in reducing iron losses at high speed.

Referring to FIG. 22, a back view of a portion of a fourth rotor 104c is shown in accordance with an illustrative embodiment. Fourth rotor 104c illustrates a MLB design that has a plurality of flux barriers positioned in a manner similar to first flux barrier 910a. In the illustrative embodiment of FIG. 22, fourth rotor 104c includes six flux barriers distributed evenly across first pole body 116a though a fewer or a greater number of flux barriers may be used. The width of each flux barrier may be determined by determining $W_{fb}$ for first flux barrier 910a of third rotor 104b and distributing that width evenly between each of the plurality of flux barriers based on the selected number of flux barrier. The flux barriers further extend across first core back face portion 306, second core back face portion 308, third core back face portion 310, fourth core back face portion 312, first core front face portion 918, second core front face portion 920, third core front face portion 922, and fourth core front face portion 924.

Figure 25:
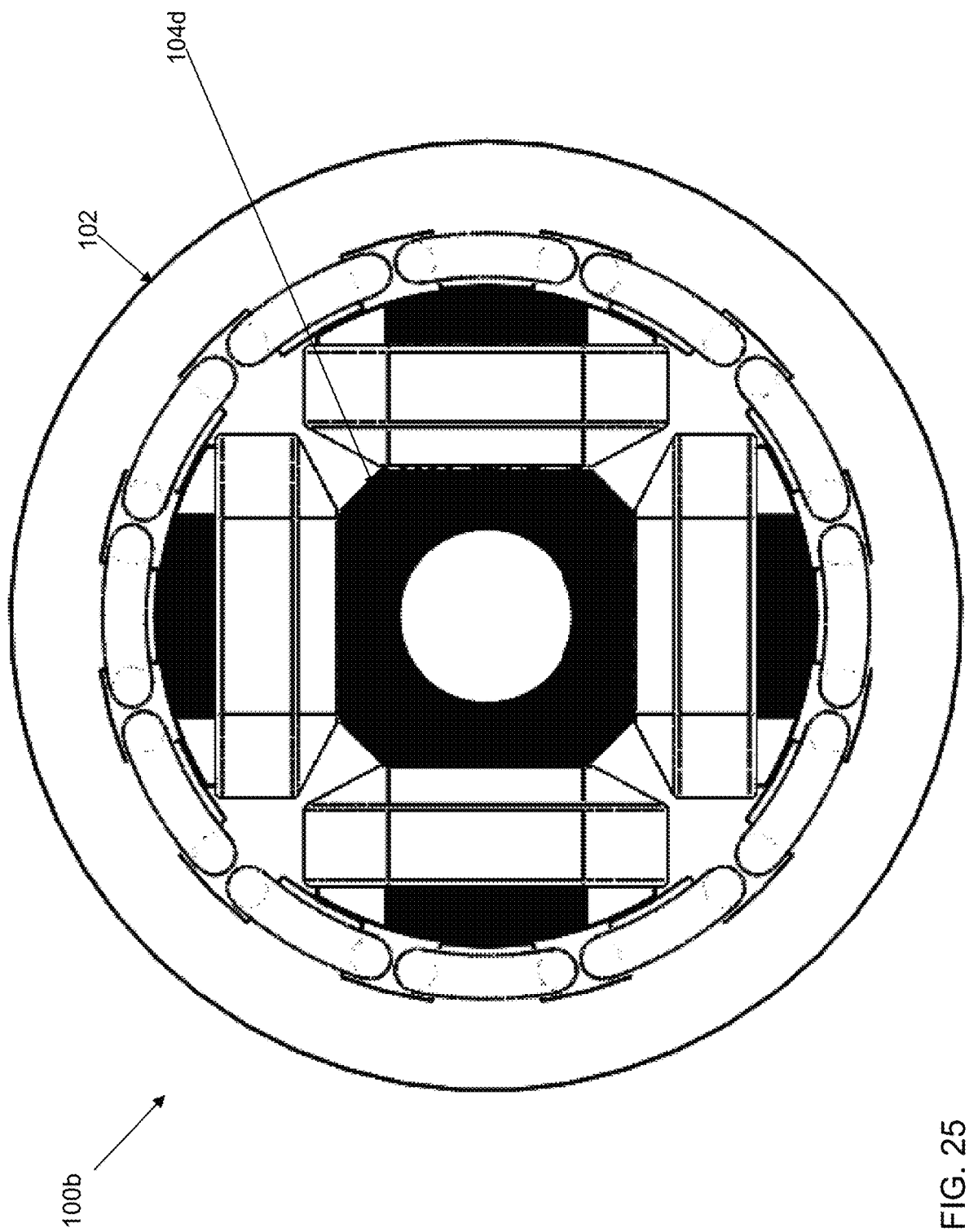
FIG. 25 depicts a front view of a salient pole WFSM with the rotor of FIG. 23 in accordance with an illustrative embodiment.

Referring to FIG. 23, a back view of a portion of a fifth rotor 104d of a third salient pole WFSM 100b (shown with reference to FIGS. 25 and 26) with a plurality of axial flux barriers is shown in accordance with an illustrative embodiment. The plurality of axial flux barriers are shown in dark areas between the plurality of laminations that are stacked parallel to each other from first pole core right face 204a to first pole core left face 206a such that first pole core front face 202a and first pole core back face 300a are not solid, but are formed of a stack of laminations between which the plurality of axial flux barriers are formed. First core back face portion 306, second core back face portion 308, third core back face portion 310, fourth core back face portion 312, first core front face portion 918, second core front face portion 920, third core front face portion 922, and fourth core front face portion 924 are further formed of a stack of laminations between which the plurality of axial flux barriers are formed.

Figure 24:
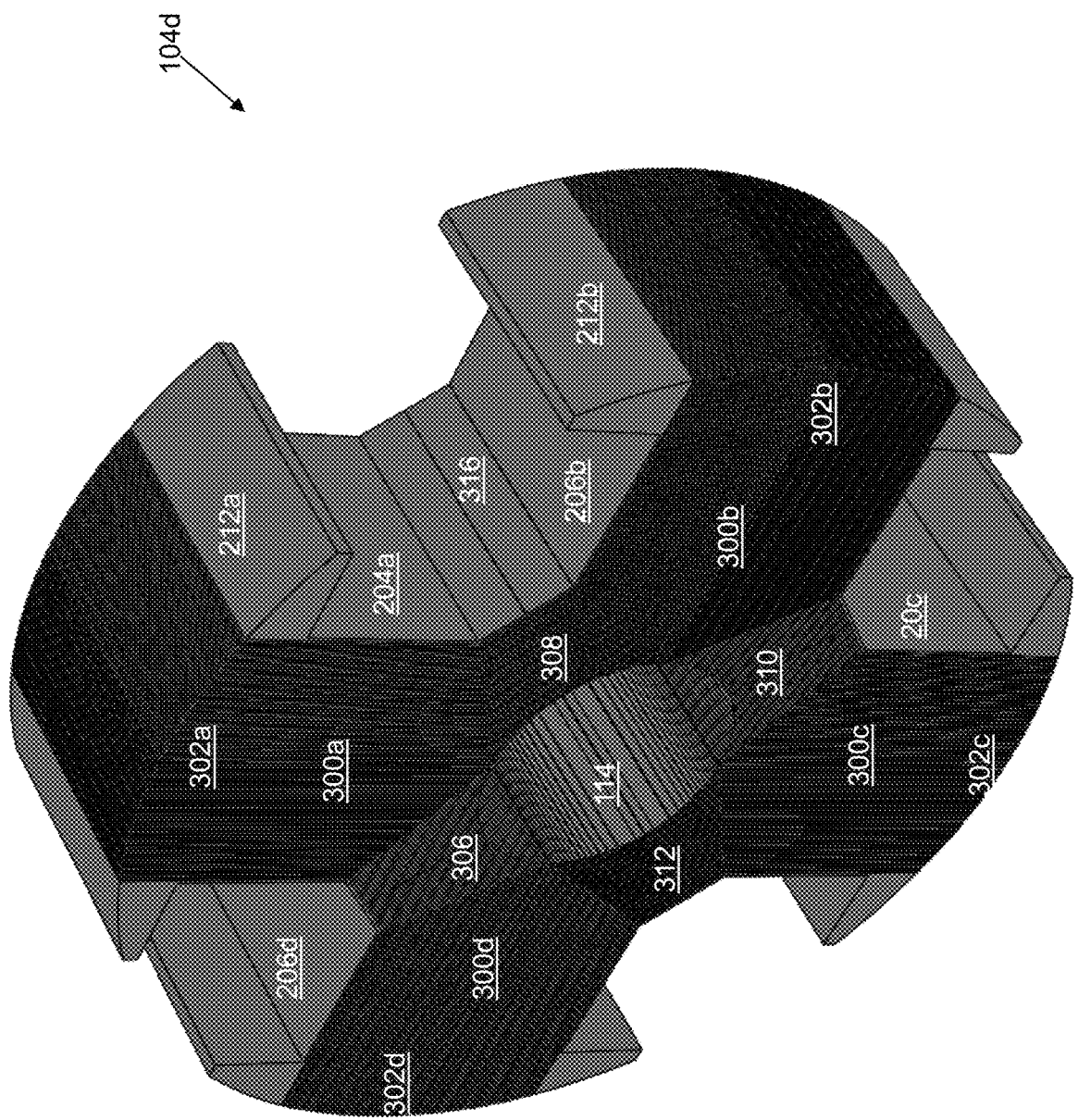
FIG. 24 depicts a perspective view of the rotor of FIG. 23 in accordance with an illustrative embodiment.
Figure 26:
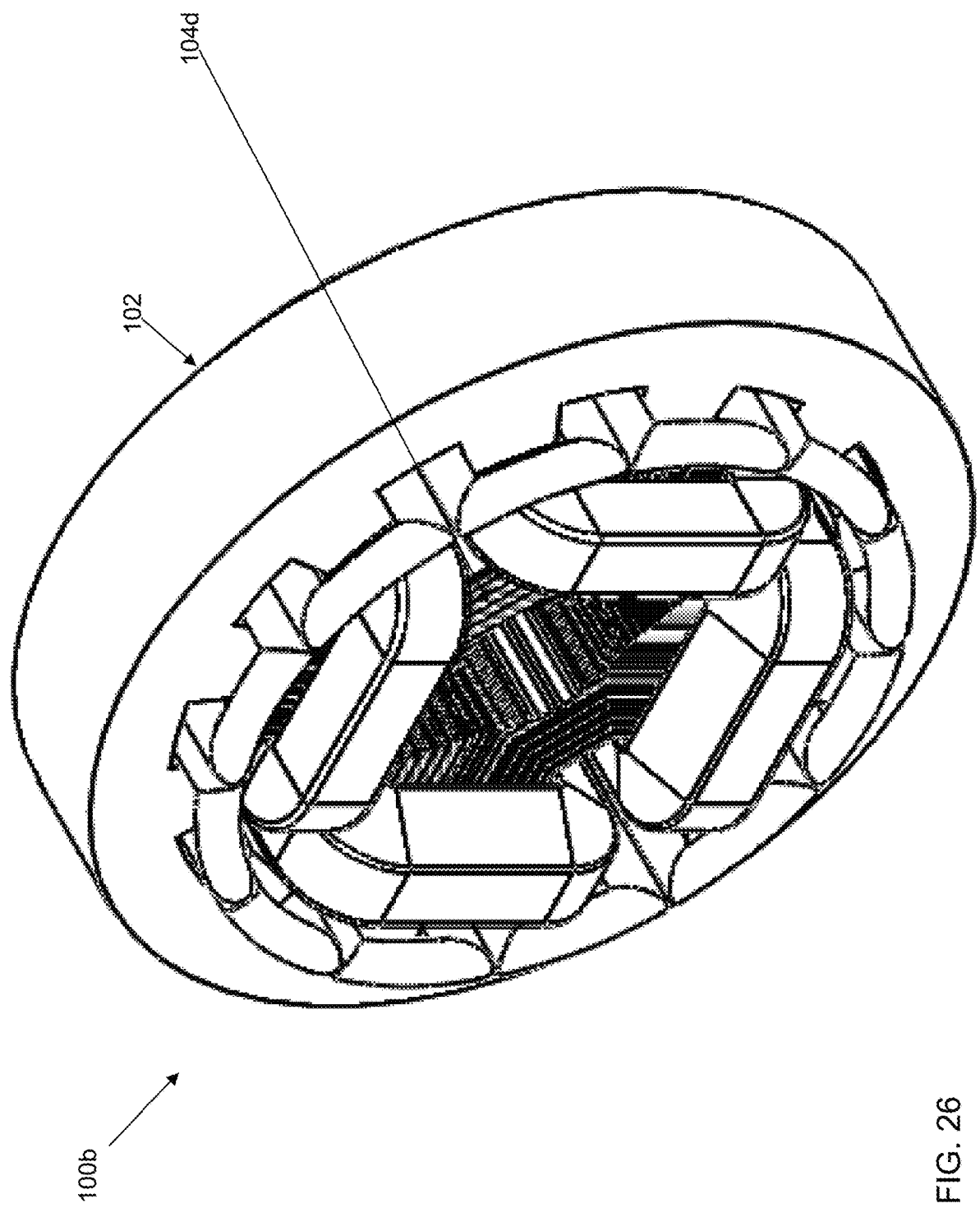
FIG. 26 depicts a perspective view of the salient pole WFSM of FIG. 23 in accordance with an illustrative embodiment.

Referring to FIG. 24, a perspective view of fifth rotor 104d is shown in accordance with an illustrative embodiment. Referring to FIG. 26, a front view of third salient pole WFSM 100b is shown in accordance with an illustrative embodiment. Referring to FIG. 27, a perspective view of third salient pole WFSM 100b is shown in accordance with an illustrative embodiment.

The width of each flux barrier may be determined by determining $W_{fb}$ for first flux barrier 910a of third rotor 104b and distributing that width evenly between each of the plurality of flux barriers that are distributed equally across each pole core front face 202a, 202d, 202c, 202d and pole core back face 300a, 300d, 300c, 300d.

As used herein, the term "mount" includes join, unite, connect, couple, associate, insert, hang, hold, affix, attach, fasten, bind, paste, secure, hinge, bolt, screw, rivet, solder, weld, glue, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element) unless specified otherwise. Elements referenced as mounted to each other herein may further be integrally formed together, for example, using a molding or thermoforming process as understood by a person of skill in the art. As a result, elements described herein as being mounted to each other need not be discrete structural elements unless specified otherwise. The elements may be mounted permanently, removably, or releasably unless specified otherwise.

Use of directional terms, such as top, bottom, right, left, front, back, upper, lower, horizontal, vertical, behind, etc. are merely intended to facilitate reference to the various surfaces of the described structures relative to the orientations introduced in the drawings and are not intended to be limiting in any manner unless otherwise indicated.

As used in this disclosure, the term "connect" includes join, unite, mount, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "connected on" and "connected to" include any interior or exterior portion of the element referenced. Elements referenced as connected to each other herein may further be integrally formed together. As a result, elements described herein as being connected to each other need not be discrete structural elements. The elements may be connected permanently, removably, or releasably.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A rotor comprising:
   a rotor core comprising a rotor shaft face configured to mount to a shaft for rotation of the rotor about a first axis;
   a plurality of pole bodies, wherein each pole body of the plurality of pole bodies comprises
      a pole core comprising
         a first pole core face extending from the rotor core; and a second pole core face extending from the rotor core;

a pole shoe mounted to the pole core, wherein the pole shoe comprises
   an arc face;
   a first tip extending from a first edge of the arc face;
   a second tip extending from a second edge of the arc face opposite the first edge;
   a first pole shoe face extending between the first tip and the first pole core face; and
   a second pole shoe face extending between the second tip and the second pole core face; and a single flux barrier forming an enclosed space filled with a material having a magnetic permeability between zero and 1000 relative to a magnetic permeability of a vacuum, wherein the single flux barrier comprises
   a top wall;
   a shaft mounting wall configured to mount to the shaft when the rotor is mounted to the shaft; and
   a plurality of interior walls connected between the top wall and the shaft mounting wall, wherein the plurality of interior walls extend parallel to and centered between the first pole core face and the second pole core face, wherein the single flux barrier extends a radial length of a respective pole body of the plurality of pole bodies from the shaft to the arc face when the rotor is mounted to the shaft; and a field winding wound around each pole core of the plurality of pole bodies.

2. The rotor of claim 1, wherein the material is air.

3. The rotor of claim 1, wherein the material is plastic.

4. The rotor of claim 1, wherein the material is selected from the group consisting of polyester, polyimide, an aromatic polyamide, and polyvinylchloride.

5. The rotor of claim 1, wherein the material is an insulator.

6. The rotor of claim 1, wherein a number of the plurality of pole bodies is an even number.

7. The rotor of claim 1, wherein the top wall is continuous with and joins the arc face.

8. The rotor of claim 1, wherein the shaft mounting wall includes a dovetail shape to mount the single flux barrier to the shaft.

9. The rotor of claim 1, wherein a flux barrier width between the plurality of interior walls is selected as a percent of a width between the first pole core face and the second pole core face when the single flux barrier is not included between the first pole core face and the second pole core face.

10. The rotor of claim 9, wherein the percent of the width is between 1% and 10%.

11. A salient pole, wound field, synchronous machine comprising:
   a stator; and
   a rotor comprising
      a rotor core comprising a rotor shaft face configured to mount to a shaft for rotation of the rotor relative to the stator about a first axis;
      a plurality of pole bodies, wherein each pole body of the plurality of pole bodies comprises
         a pole core comprising
            a first pole core face extending from the rotor core; and
            a second pole core face extending from the rotor core;
         a pole shoe mounted to the pole core, wherein the pole shoe comprises
            an arc face;
            a first tip extending from a first edge of the arc face;
            a second tip extending from a second edge of the arc face opposite the first edge;
            a first pole shoe face extending between the first tip and the first pole core face; and
            a second pole shoe face extending between the second tip and the second pole core face; and
         a single flux barrier forming an enclosed space filled with a material having a magnetic permeability between zero and 1000 relative to a magnetic permeability of a vacuum, wherein the single flux barrier comprises
            a top wall;
            a shaft mounting wall configured to mount to the shaft when the rotor is mounted to the shaft; and
            a plurality of interior walls connected between the top wall and the shaft mounting wall, wherein the plurality of interior walls extend parallel to and centered between the first pole core face and the second pole core face, wherein the single flux barrier extends a radial length of a respective pole body of the plurality of pole bodies from the shaft to the arc face when the rotor is mounted to the shaft; and
      a field winding wound around each pole core of the plurality of pole bodies.

12. The machine of claim 11, wherein the material is air.

13. The machine of claim 11, wherein the material is plastic.

14. The machine of claim 11, wherein the material is selected from the group consisting of polyester, polyimide, an aromatic polyamide, and polyvinylchloride.

15. The machine of claim 11, wherein the material is an insulator.

16. The machine of claim 11, wherein a number of the plurality of pole bodies is an even number.

17. The machine of claim 11, wherein the top wall is continuous with and joins the arc face.

18. The machine of claim 11, wherein the shaft mounting wall includes a dovetail shape to mount the single flux barrier to the shaft.

19. The machine of claim 11, wherein a flux barrier width between the plurality of interior walls is selected as a percent of a width between the first pole core face and the second pole core face when the single flux barrier is not included between the first pole core face and the second pole core face.

20. The machine of claim 19, wherein the percent of the width is between 1% and 10%.

* * * * *

UNITED STATES PATENT AND TRADEMARK OFFICE
CERTIFICATE OF CORRECTION

PATENT NO. : 10,784,727 B2
APPLICATION NO. : 15/371949
DATED : September 22, 2020
INVENTOR(S) : Thomas A. Lipo et al.

Page 1 of 1

It is certified that error appears in the above-identified patent and that said Letters Patent is hereby corrected as shown below:

In the Specification

Column 10, Line 52:

Delete the phrase "a stator loss $I_s\ ^2R$" and replace with --a stator loss $I_s^2R$--.

Column 14, Line 35:

Delete the phrase "along with $I_s\ ^2$." and replace with --along with $I_s^2$.--.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*